United States Patent
Han et al.

(10) Patent No.: US 8,676,865 B2
(45) Date of Patent: Mar. 18, 2014

(54) ADAPTIVE LAZY MERGING

(75) Inventors: Wei Han, Beaverton, OR (US); Lin Qiao, San Jose, CA (US); Vijayshankar Raman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1136 days.

(21) Appl. No.: 12/123,598

(22) Filed: May 20, 2008

(65) Prior Publication Data

US 2009/0292714 A1    Nov. 26, 2009

(51) Int. Cl.
*G06F 7/00*    (2006.01)
*G06F 17/30*    (2006.01)

(52) U.S. Cl.
USPC ......................................................... 707/808

(58) Field of Classification Search
USPC .................................................. 707/202, 808
See application file for complete search history.

(56) References Cited

U.S. PATENT DOCUMENTS

| | | | |
|---|---|---|---|
| 5,357,250 A * | 10/1994 | Healey et al. | 341/107 |
| 5,590,324 A * | 12/1996 | Leung et al. | 1/1 |
| 6,801,905 B2 * | 10/2004 | Andrei | 1/1 |
| 7,320,109 B1 * | 1/2008 | Zeevi et al. | 715/763 |
| 7,596,574 B2 * | 9/2009 | Sweeney | 1/1 |
| 2002/0078015 A1 | 6/2002 | Ponnekanti | |
| 2003/0097385 A1 | 5/2003 | Lee et al. | |
| 2003/0172059 A1 * | 9/2003 | Andrei | 707/3 |
| 2005/0144167 A1 | 6/2005 | Yamamoto | |
| 2006/0129610 A1 * | 6/2006 | Agarwal et al. | 707/202 |
| 2008/0065599 A1 * | 3/2008 | Baio et al. | 707/3 |

OTHER PUBLICATIONS

Raman, Vijayshankar., "Lazy, Adaptive Rid-List Intersection, and Its Application to Index Anding." Sigmod'07, Jun. 12-14, 2007 Beijing, China, Acm 978-1-59593-686-Aug. 07, 0006.*
Ding et al., ("A Compiler Scheme for Reusing Intermediate Computation Results"), Proceedings of the International Symposium on Code Generation and Optimization (CGO 2004) 0-7695-2102-9/04 $20.00 © 2004 IEEE.*
Antoshenkov et al. ("Query processing and optimization in Oracle Rdb"), Oracle Corporation, New England Development Center, 110 Spit Brook Road, Nashua, NH 03062, USA; e-mail: zmohamed@us.oracle.com Edited by C. Mohan / Received Aug. 1994 / Acceped Aug. 1995.*
Ding, Yonghua et al.., "A Compiler Scheme for Reusing Intermediate Computation Results"Proceedings of the International Symposium on Code Generation and Optimization (CGO'04) 0-7695-2102-9/04© 2004 IEEE.*

(Continued)

*Primary Examiner* — Tony Mahmoudi
*Assistant Examiner* — Muluemebet Gurmu
(74) *Attorney, Agent, or Firm* — Gibb & Riley, LLC

(57) ABSTRACT

A query processing method intersects two or more unsorted lists based on a conjunction of predicates. Each list comprises a union of multiple sorted segments. The method performs lazy segment merging and an adaptive n-ary intersecting process. The lazy segment merging comprises starting with each list being a union of completely unmerged segments, such that lookups into a given list involve separate lookups into each segment of the given list. The method intersects the lists according to the predicates while performing the lazy segment merging, such that the lazy segment merging reads in only those portions of each segment that are needed for the intersecting. As the intersecting proceeds and the lookups are performed, the intersecting selectively merges the segments together, based on a cost-benefit analysis of the cost of merging compared to the benefit produced by reducing a number of lookups.

23 Claims, 15 Drawing Sheets

(56) References Cited

OTHER PUBLICATIONS

Antoshenkov, Gennady et al., "Query processing and optimization in Oracle Rdb", Oracle Corporation, New England Development Center, 110 Spit Brook Road, Nashua, NH 03062, USA; e-mail: zmohamed@us.oracle.com Edited by C. Mohan / Received Aug. 1994 / Acceped Aug. 1995.*

Raman et al., "Lazy, Adaptive Rid-List Intersection, and Its Application to Index Anding," (Sigmod '07) Acm, pp. 773-784, 2007.

Graefe, "Query Evaluation Techniques for Large Databases," Portland State University, Computer Science Department (Based on a survey with the same title published in *ACM Computing Surveys*, 25(2) p. 73-170, Jun. 1993,), Revision of Nov. 10, 1993.

Sun et al., "Online B-Tree Merging," (Sigmod 2005) Acm, pp. 335-346, 2005.

Xin et al., "Progressive and Selective Merge: Computing Top-K with Ad-Hoc Ranking Functions," (SIGMOD 2007) *ACM*, pp. 1-12, 2007, http://www.cs.uiuc.edu/~hanj/pdf/sigmod07_dongxin.pdf.

R. Avnur and J. Hellerstein. Eddies, "Continuously Adaptive Query Processing," .In SIGMOD, 2000, pp. 267-272.

A. Balmin, T. Eliaz, J. Hornibrook, L. Lim, G. M. Lohman, D. Simmen, M. Wang, and C. Zhang, "Cost-Based Optimization in DB2 XML," IBM Systems Journal, 45(2), 2006, pp. 1-23.

J. Barbay and C. Kenyon, "Adaptive Intersection and T-Threshold Problems," In SODA, 2002, pp. 390-399.

N. Bruno, N. Koudas, and D. Srivastava, "HolisticTwig Joins: Optimal Xml Pattern Matching," In SIGMOD, 2002, pp. 1-12.

E. Demaine, A. L'opez-Ortiz, and J. Munro, "Adaptive Set Intersections, Unions, and Differences," In SODA, 2000, pp. 29-43.

M. Kamath and K. Ramamritham, "Bucket Skip Merge Join: A Scalable Algorithm for Join Processing in Very Large Databases Using Indexes," Technical Report UM-CS-1996-020, University of Massachusetts at Amherst, 1996, Abstract p. 1.

C. Mohan, Don Haderle, Yun Wang, and Josephine Cheng, "Single Table Access Using Multiple Indexes: Optimization, Execution, and Concurrency Control Techniques," In Proceedings of the International Conference on Extending Database Technology, 1990, pp. 29-43.

Shivnath Babu, Rajeev Motwani, Kamesh Mungala, Itaru Nishizawa, and Jennifer Widom, "Adaptive Ordering of Pipelined Stream Filters," In SIGMOD, 2004, pp. 1-10.

P. O'Neil and D. Quass, "Improved Query Performance With Variant Indexes," In SIGMOD, 1997, pp. 38-49.

* cited by examiner

// Gets the next Leg to search, probabilistically
**nextList(*)**
1. with probability * go round-robin:
2.     return (currLeg+1) % number of Legs;
3. with probability * * * go to most promising leg:
4.     if currLeg!=best Leg
5.         return bestLeg;
6.     else if currLeg!=nextBestLeg
7.         return nextBestLeg;
8.     else return (currLeg+1) % number of legs;

FIG. 7

RIDS in L1 intersect L2 intersect L3

One Segment in Leg M

|  | Page1 | Page2 | Page3 | Page4 | Page5 | Page6 |
|---|---|---|---|---|---|---|
| HighRID | 500 | 1000 | 1500 | 2000 | 2500 | None |
| Rid Range | (0, 500] | (500, 1000] | (1000, 1500] | (1500, 2000] | (2000, 2500] | (2500, INF] |

| Name | Cardinality | Clustered Fact Table Index | Skewed Distribution |
|---|---|---|---|
| Orders (O) | 10,000,000 | - | - |
| Product (DP) | 100,000 | N | N |
| Customer (DC) | 10,000 | N | N |
| Time (DT) | 1,000 | Y | N |
| Employee (DE) | 500 | N | N |
| Account (DA) | 1000 | N | Y |
| Store (DS) | 10 | N | N |
| Warehouse (DW) | 2 | N | N |

Best AND-tree vs worst AND-tree

Best AND-tree vs round-rodin

Best AND-tree vs probabilistic round-robin

| Section | Selectivity | No Merging ||||| Eager Merging ||||| Lazy Merging |||||
|---|---|---|---|---|---|---|---|---|---|---|---|---|---|---|---|
| | | Elapsed Time || # of IO's || | Elapsed Time || # of IO's || | Elapsed Time || # of IO's || |
| | | Merge | And | Merge | And | | Merge | And | Merge | And | | Merge | And | Merge | And |
| 4.1.1 | 0.02x0.1x0.5x0.01 | 0.125 | 0.685 | 1950 | 2998 | | 1.843 | 0.133 | 11032 | 0 | | 0.125 | 0.225 | 1950 | 2998 |
| | 0.02x0.1x0.5x0.05 | 0.125 | 1.589 | 1950 | 5303 | | 2.251 | 0.347 | 12324 | 0 | | 0.125 | 0.793 | 1950 | 5303 |
| | 0.02x0.1x0.5x0.10 | 0.125 | 2.152 | 1950 | 7441 | | 2.653 | 0.381 | 13613 | 0 | | 0.125 | 1.117 | 1950 | 7441 |
| | 0.02x0.1x0.5x0.15 | 0.125 | 3.126 | 1950 | 9430 | | 3.040 | 0.396 | 14901 | 0 | | 0.125 | 1.381 | 1950 | 9430 |
| | 0.02x0.1x0.5x0.20 | 0.125 | 4.268 | 1950 | 11664 | | 3.501 | 0.425 | 16224 | 0 | | 0.125 | 1.883 | 1950 | 11664 |
| | 0.02x0.1x0.5x0.25 | 0.125 | 5.906 | 1950 | 13472 | | 3.914 | 0.434 | 17515 | 0 | | 0.125 | 2.183 | 1950 | 13472 |
| 4.1.2 | 0.02x0.1x0.5x0.01x0.5 | 0.140 | 1.034 | 1950 | 7676 | | 6.312 | 0.157 | 23942 | 0 | | 0.140 | 0.491 | 1950 | 7676 |
| | 0.02x0.1x0.5x0.05x0.5 | 0.140 | 2.459 | 1950 | 17319 | | 6.68 | 0.368 | 25234 | 0 | | 0.140 | 1.542 | 1950 | 17319 |
| | 0.02x0.1x0.5x0.10x0.5 | 0.140 | 3.302 | 1950 | 19594 | | 7.044 | 0.418 | 26519 | 0 | | 0.140 | 1.908 | 1950 | 19594 |
| | 0.02x0.1x0.5x0.15x0.5 | 0.140 | 4.289 | 1950 | 21592 | | 7.458 | 0.448 | 27810 | 0 | | 0.140 | 2.237 | 1950 | 21592 |
| | 0.02x0.1x0.5x0.20x0.5 | 0.140 | 5.117 | 1950 | 23561 | | 7.936 | 0.462 | 29102 | 0 | | 0.140 | 2.560 | 1950 | 23561 |
| | 0.02x0.1x0.5x0.25x0.5 | 0.140 | 6.100 | 1950 | 25361 | | 8.277 | 0.476 | 30392 | 0 | | 0.140 | 2.832 | 1950 | 25361 |
| 4.1.3 | 0.02x0.1x0.5x0.01x0.1 | 0.140 | 0.115 | 1950 | 1560 | | 1.940 | 0.017 | 12374 | 0 | | 0.140 | 0.088 | 1950 | 1781 |
| | 0.02x0.1x0.5x0.05x0.1 | 0.140 | 0.219 | 1950 | 2081 | | 2.337 | 0.040 | 13668 | 0 | | 0.140 | 0.167 | 1950 | 2304 |
| | 0.02x0.1x0.5x0.10x0.1 | 0.140 | 0.289 | 1950 | 2459 | | 2.755 | 0.047 | 14957 | 0 | | 0.140 | 0.239 | 1950 | 2683 |
| | 0.02x0.1x0.5x0.15x0.1 | 0.140 | 0.386 | 1950 | 2823 | | 3.126 | 0.051 | 16245 | 0 | | 0.140 | 0.310 | 1950 | 3047 |
| | 0.02x0.1x0.5x0.2x0.1 | 0.140 | 0.451 | 1950 | 3179 | | 3.598 | 0.054 | 17532 | 0 | | 0.140 | 0.380 | 1950 | 3403 |
| | 0.02x0.1x0.5x0.25x0.1 | 0.140 | 0.581 | 1950 | 3505 | | 3.908 | 0.057 | 18823 | 0 | | 0.140 | 0.466 | 1950 | 3729 |

FIG. 18

| Name | Cardinality | Distribution of foreign keys |
|---|---|---|
| Fact Table (O) | 10,000,00 | - |
| Product (DP) | 100,000 | Uniform |
| Customer (DC) | 10,000 | Uniform |
| Employee (DE) | 500 | Uniform |
| Store(DS) | 10 | Uniform |
| DFW1 | 1000 | Forward RID Correlation |
| DFW2 | 100 | Forward RID Correlation |
| DFW3 | 10 | Forward RID Correlation |
| DBW1 | 1,000 | Backward RID Correlation |
| DBW2 | 100 | Backward RID Correlation |
| DBW3 | 10 | Backward RID Correlation |

FIG. 19

ADAPTIVE LAZY MERGING

BACKGROUND

1. Field of the Invention

The embodiments of the invention generally relate to list processing, and, more particularly, to intersecting lists using lazy segment merging and an adaptive n-ary intersecting process.

2. Description of the Related Art

Row identification (id) list (RID-List) intersection is a common strategy in query processing, used in star joins, column stores, and even search engines. To apply a conjunction of predicates on a table, a query processor does index lookups to form sorted RID-lists (or bitmap) of the rows matching each predicate, then intersects the RID-lists via an AND-tree, and finally fetches the corresponding rows to apply any residual predicates and aggregates.

Currently, the most popular way of doing RID-list intersection is index anding: using a suitable index (often a bitmap index), construct one or several lists of matching RIDs for each predicate, merge all the RID lists for each predicate, and then intersect all the lists together to compute the intersection. This process is shown in FIG. 1 where lists of RIDs 104 are merged into segments 102, which can be intersected according to a predicate (AND) 100. The problem with usual implementation of index anding is: (a) the RID list merge 102 is often expensive, and (b) the intersection 100 is done via a binary AND-tree, whose performance is highly sensitive to the ordering of lists in the tree.

This process can be expensive when the RID-lists are large. Furthermore, the performance is sensitive to the order in which RIDlists are intersected together, and to treating the right predicates as residuals. If the optimizer chooses a wrong order or a wrong residual, due to a poor cardinality estimate, the resulting plan can run orders of magnitude slower than expected.

SUMMARY

An embodiment of the invention provides a query processing method to intersect two or more unsorted lists based on a conjunction of predicates. Each list comprises a union of multiple sorted segments. The method performs lazy segment merging and an adaptive n-ary intersecting process.

More specifically, the lazy segment merging starts with each list being a union of completely unmerged segments, such that lookups into a given list involve separate lookups into each segment of the given list.

The method intersects the lists according to the predicates while performing the lazy segment merging, such that the lazy segment merging reads in only those portions of each segment that are needed for the intersecting. The intersecting further comprises determining if each leg has an RID (a leg comprises an RID list corresponding to a predicate). The intersecting separately intersects each segment of a leg that has an RID. In addition, the lists comprise index leaf pages and the lazy segment merging only merges ones of the leaf pages that possibly contain RIDs.

As the intersecting proceeds and the lookups are performed, the intersecting selectively merges the segments together, based on a cost-benefit analysis of the cost of merging compared to the benefit produced by reducing a number of lookups. The cost and benefit comprise measures of processing time. The intersecting comprises an adaptive n-ary intersection process that dynamically varies which leg to process, based on a relative density of row identifications (RIDs) within the legs.

These and other aspects of the embodiments of the invention will be better appreciated and understood when considered in conjunction with the following description and the accompanying drawings. The embodiments herein should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which:

FIG. 7 illustrates pseudo code for probabilistic intersection;

FIG. 18 is a table illustrating elapsed time and IOs for experiments of Section 4.1-4.13, split into merge and intersect ("and") phases;

FIG. 19 is a table illustrating adaptive intersection experiments;

DETAILED DESCRIPTION OF EMBODIMENTS

Figure 1:
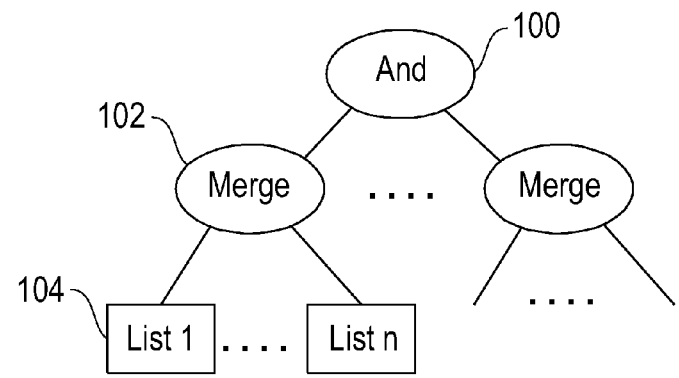
FIG. 1 illustrates a example of an index anding plan.

The embodiments of the invention and the various features and advantageous details thereof are explained more fully with reference to the non-limiting embodiments that are illustrated in the accompanying drawings and detailed in the following description. The embodiments herein should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

The embodiments herein present a new methodology for RID-list intersection that is both more efficient and more robust than the standard methodology. First, the embodiments herein avoid forming the RID-lists up front, and instead form this lazily as part of the intersection. This reduces the associated IO and sort cost significantly, especially when the data distribution is skewed. The embodiments herein also ameliorate the problem of wrong residual table selection. Second, the embodiments herein do not intersect the RID-lists via an AND-tree, because this is vulnerable to cardinality mis-estimations. Instead, the embodiments herein use an adaptive set intersection methodology that performs well even when the cardinality estimates are wrong.

Thus, the embodiments herein address the above issues and improve on index anding in two ways: (a) the embodiments herein form and merge the RID lists lazily, only when necessary, and (b) the embodiments herein AND the RID lists adaptively. Hence, the embodiments herein are more robust in intersecting when cardinalities are misestimated. The embodiments herein analyze the extent of this robustness through competitive analysis, where the embodiments herein compare the worst-case performance against that of a perfect oracle. Before introducing this methodology, this disclosure briefly reviews how index anding works.

1.1 Primer on Index Anding

Figure 2:
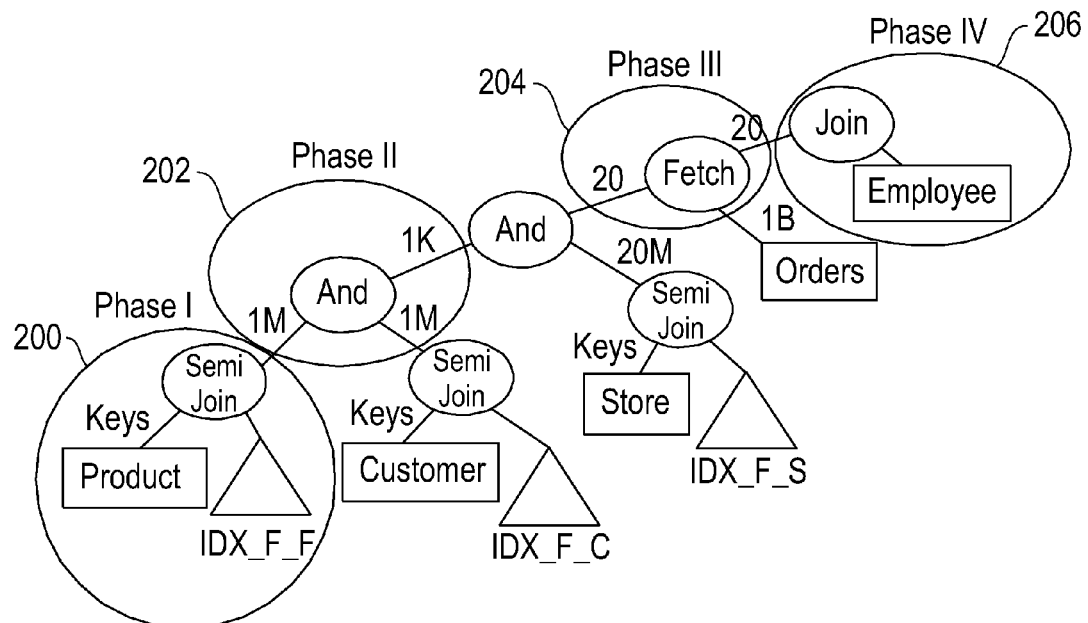
FIG. 2 illustrates a example of an index anding plan.

This section explains index anding using the query of Example 1. FIG. 2 shows an execution plan for this query, which has four phases, 200, 202, 204, and 206. RID-list formation is shown as item 200. The first step is to find RID-lists of Orders tuples that satisfy each predicate (this disclosure will also use the term "leg" to mean the RID-list corresponding to a predicate). This example starts by finding the matching rows in the dimension tables, and uses the dimension keys in the matches to look up an appropriate foreign key index on Orders. The results of this lookup are lists of matching RIDs for each value of dimension key. These lists are sometimes referred to herein as segments.

This example now has a collection of segments that satisfy the predicate (one for each value of the foreign key). This example merges the RIDs in all these segments together to form a single sorted leg for this predicate (e.g., for a predicate category="coffee", this example looks up into an index on prodId with each value in {P.id|category="coffee"}).

The intersecting is shown as item 202, which computes the intersection of these legs via a tree of AND operators. Fetching is shown as item 204, where the list of RIDs in the intersection, i.e., ones that match every predicate, is usually much smaller than the fact table size. So this example directly fetches the fact table rows corresponding to these RIDs (RIDs are usually physical (page, slot) identifiers).

Residuals are shown as item 206, where these fetched rows are joined with all the remaining dimension tables (residual tables), to get any remaining columns and evaluate any residual predicates. With most predicates, the optimizer has a choice of applying them via the intersection or as a residual. Applying via the intersection has the benefit of early filtering of rows, but the cost is that of forming the matching RID-list. Usually only very poorly selective predicates (where almost no row is filtered) are chosen as residuals.

Although the index anding in this example is widely used, this example has two problems, performance, and predictability. With respect to performance, the join needs to form a segment of matching RIDs for each foreign key satisfying a predicate, and then merge these segments into a unified RID-list for each predicate. The segment formation involves scanning and parsing index leaf pages, and the merge involves sorting. Both of these operations are expensive when the number of matching RIDs is large.

Figure 3:
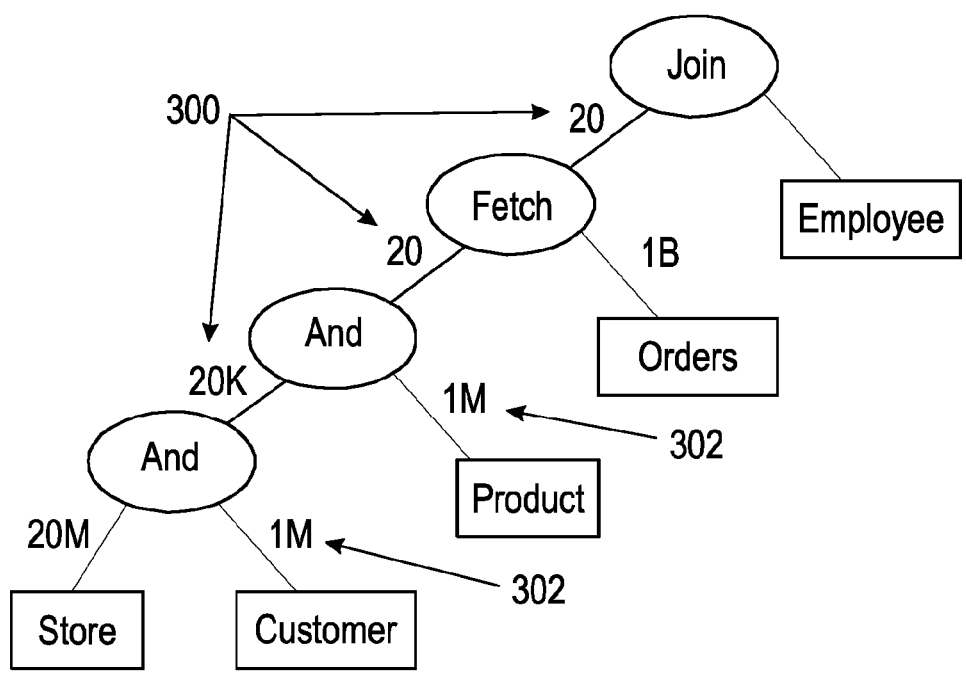
FIG. 3 illustrates poor and tree and right residuals.

With respect to predictability, the performance of index anding is very sensitive to two optimizer decisions operator order in the AND-tree and choice of residuals. With respect to operator order in the AND-tree, since the cost of a pairwise AND is related to the input sizes, it is important to AND early those pairs of legs that have small intersections. FIG. 3 shows a more expensive AND-tree where very large legs 300 of sizes up to 20M are intersected first. Instead, small legs 302, such as product and customer, should be intersected first.

Figure 4:
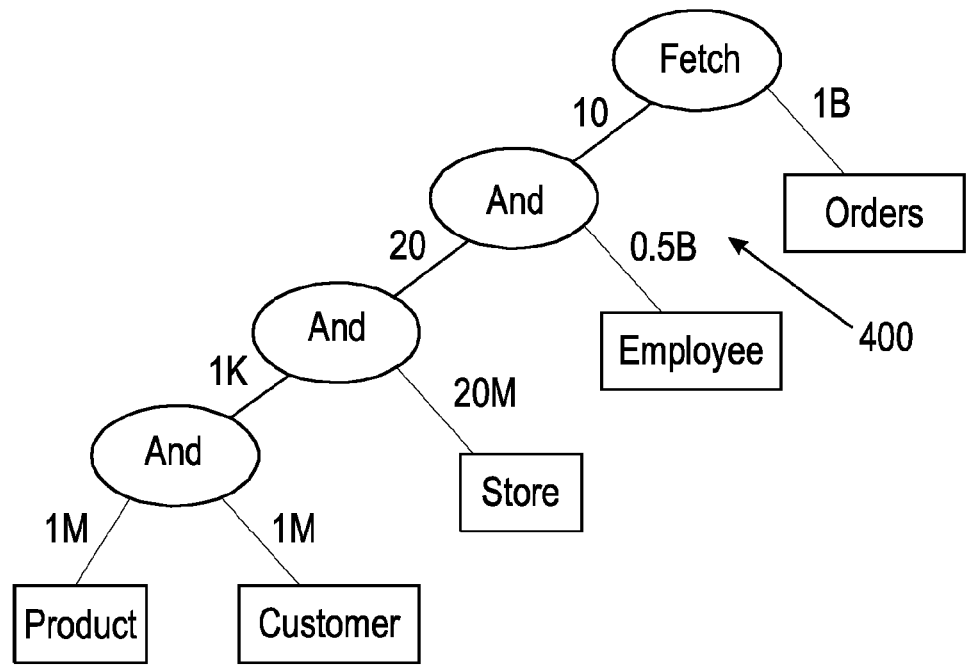
FIG. 4 illustrates right and tree and poor residuals.

With respect to choice of residuals, segment formation and merging is especially slow for poorly selective predicates that have lots of matching RIDs. This situation can arise if the optimizer does a bad job of choosing residual predicates. For example, FIG. 4 shows another AND-tree for the same query where the predicate on Employee 400 is applied during index-anding rather than as a residual. The cost of forming a merged leg of size 0.5B will by itself be far higher than the cost of the entire plan of FIG. 3.

If the optimizer mis-estimates cardinalities of one or more intersection legs, or due to correlation, mis-estimates the cardinality of an intermediate intersection result, the process could pick a plan with a poor AND-tree or residual.

1.2 Adaptive Intersection and Lazy Merging

It is understood that cardinality estimation is a fundamentally hard problem, especially in the presence of correlations [7]. To tackle both the efficiency and robustness shortcomings of index-anding, the embodiments herein provide a new methodology for index anding that changes both the way RID-lists are formed for each predicate, and the way they are intersected. This methodology uses lazy merging and adaptive intersecting.

In the lazy merging, the embodiments herein do not form the full RID-lists for each value of foreign key up front. Instead, the embodiments herein do this on demand, during the intersection phase itself, thereby forming only the portion of the RID-lists needed for intersection (e.g., the embodiments herein only scan leaf pages that can possibly contain RIDs in the intersection result). Due to this deferred segment formation, the embodiments herein also can defer the merging of segments to form sorted legs. But this can get expensive when one leg has several segments during intersection. Thus, when the embodiments herein check if a leg has a RID, the embodiments herein separately check in each of its segments. The embodiments herein can use an online methodology that monitors this overhead and dynamically determines how long it is worthwhile to defer segment formation and merging. This methodology is competitive to a factor 2 to an oracle that chooses the best time to merge each segment.

With respect to adaptive intersection, the embodiments herein avoid the risk of cardinality mis-estimation by using an n-ary intersection rather than an AND-tree for intersecting the legs. This n-ary intersection is based on Demaine et al's adaptive set intersection methodology [5]. But unlike the round robin policy used in [5], the embodiments herein dynamically vary which leg to look at based on the recent density of RIDs in each leg.

1.3 Outline of the Disclosure

The next two sections describe the details of adaptive intersection and lazy merging.

2. Adaptive Intersection

The embodiments herein start with the intersection phase. For this section, it is assumed that for each predicate the embodiments herein have already formed a sorted leg of RIDs matching that predicate. This list is exposed to the intersection via a SortedRidList interface:

RID start( ): opens a cursor on this sorted list return the first RID

RID getNext( ): return the next RID and advances the cursor bool eof( ): return true if cursor is at end of list RID lookup(RID x): checks if x exists in this list:
   if found, return x
   else return the smallest RID>x This interface is a simple list iterator, plus a lookup function that does a binary search. In Section 3 this disclosure describes how to support such an interface lazily, without actually forming a sorted leg up front.

2.1 Traditional AND-Tree

In terms of this SortedRidList interface, the AND-tree approach of FIGS. 1, 2, and 3 is simple. The embodiments herein construct a tree of iterators, where each iterator repeatedly calls getNext( ) on its left leg and lookup( ) on its right leg. For example, the following logic intersects two legs $L_1$, $L_2$ by an AND-tree $(L_1, L_2)$:

1. for each RID x in $L_1$ do
2. y←$L_2$.lookup(x)
3. if (y=x) output y

The following notation is helpful in analyzing the sequence of lookups that occur during intersection. Consider each RID as a point in a number line [0, |fact table|]. So a leg of sorted RIDs becomes a number line annotated with hash marks corresponding to its elements.

Figure 5:
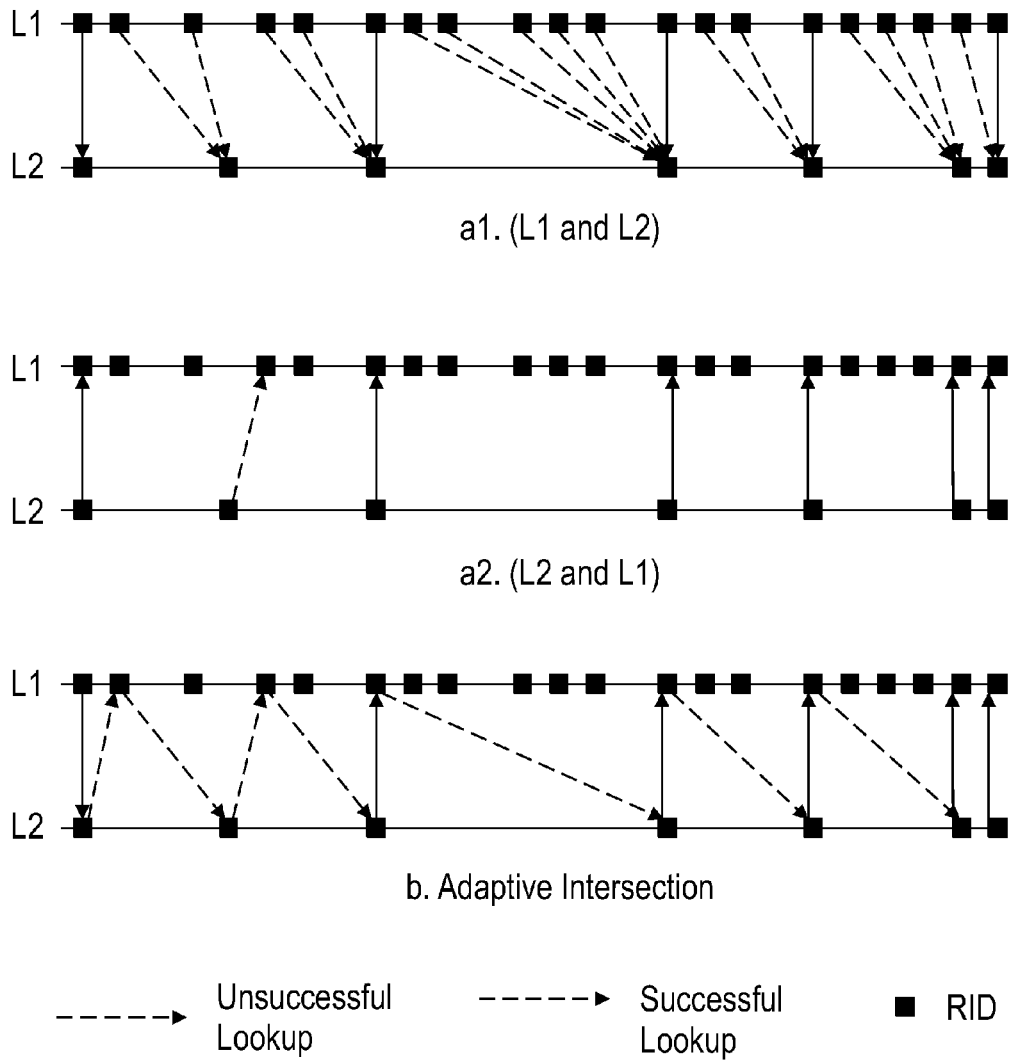
FIG. 5 illustrates three ways of intersecting two sorted lists.

For example, in FIG. 5, in the legs shown as a1, the densely marked horizontal line L1 is a leg with many RIDs, while the sparsely marked line L2 is a leg with few RIDs. FIG. 5 illustrates the above AND-tree: each lookup( ) is shown by an arrow: successful matches are solid arrows and unsuccessful ones are dashed. One could also do the intersection with a converse AND-tree $(L_2, L_1)$ (legs a2), where the embodiments herein scan RIDs in $L_2$ and lookup into $L_1$.

If the leg sizes are m=|$L_1$| and n=|$L_2$|, the first AND-tree takes O(m log n) time and the second takes O(n log m) time. If the leg sizes are very different (say $10^3$ and $10^6$), a wrong AND-tree, which could be chosen due to bad cardinality estimation, will perform much worse than the right one. This disclosure now presents an alternative way to do intersections that avoids this risk of choosing a wrong AND-tree. The embodiments herein start with a round-robin intersection methodology proposed by Demaine et. al. before describing the inventive probabilistic methodology.

2.2 Round-Robin Intersection

Consider the following variant of the $(L_1, L_2)$ AND-tree 1. x←$L_1$.start( )
2. while not ($L_1$.eof( ) and $L_2$.eof( )) do
3. y←$L_2$.lookup(x)
4. if (y=x) {output y; y←$L_2$.getNext( )}
5. x←$L_1$.lookup(y)
6. if (x=y) {output x; x←$L_1$.getNext( )}

The essential idea, as illustrated in legs b in FIG. 5, is to sweep through the number line of all RIDs by alternate lookups into $L_1$ and $L_2$. Initially, the entire range [x=0,∞) could be in the intersection. If $L_2$.lookup(x) returns y which is >x, the embodiments herein know for sure that none of RIDs in [x, y) belongs to the intersection. So the embodiments herein continue the sweep in [y, ∞).

The robustness of this alternating methodology is easily seen from legs b in FIG. 5. Every RID in the smaller list $L_2$ is incident to at most two arrows: so there are at most 2 min(m, n) lookup( )s. In practice, the performance is even better, because lookup( ) can jump over several RIDs.

The methodology proposed by Demaine et al is a n-ary version of this 2-ary alternating intersection. The methodology still sweeps through the domain of RIDs by repeatedly invoking lookup( ). But, instead of switching back and forth between two lists $L_1$ and $L_2$, this methodology does lookup( ) into all the n lists being intersected, in a round-robin fashion. Only when a RID has found matches in all the n lists do the embodiments herein output the RID and invoke getNext( ) to move on to the next RID. Otherwise, it continues to invoke lookup( ).

Figure 6C:
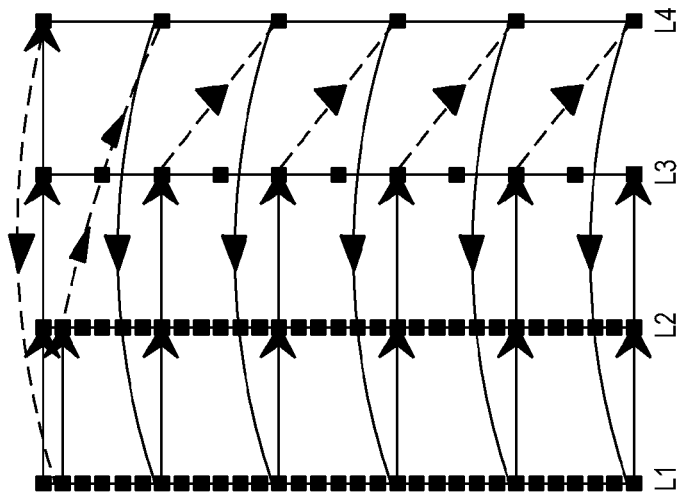
FIGS. 6$a$-6$c$ illustrates three ways of intersecting 4 RID-lists.

FIG. 6*c* illustrates this process in an intersection of 4 legs. Notice that the embodiments herein start on the dense legs $L_1$, $L_2$, but because of the round-robin nature, the number of lookup( )s is proportional to the size of the sparsest leg $L_4$.

Figure 6B:
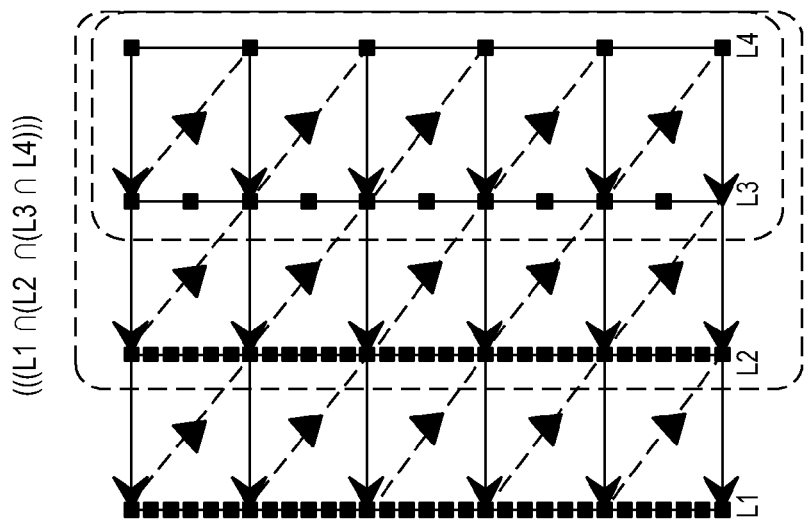

In contrast, an AND-tree like $(((L_1, L_2), L_3), L_4)$ (FIG. 6*a*) performs a huge number of lookup( )s intersecting the dense legs $L_1$ and $L_2$, and so performs far worse. The best AND-tree for this intersection is $(((L_4, L_3), L_2), L_1)$, shown in FIG. 6*b*.

This round-robin intersection has been extensively analyzed in [5] and [3], and the embodiment herein is known to always perform within a factor k of the best AND-tree, where there are k legs. Intuitively, a round-robin intersection looks up in every leg, and in particular, in the most sparse leg, once in k lookups. So the embodiments herein will never perform more than k times as many lookups as the best AND-tree.

2.3 Probabilistic Intersection

As compared to an AND-tree, this round robin intersection is robust. But this is rather conservative, and a correctly chosen ANDtree can perform better. In the example of FIG. 6*c* itself, the round robin intersection persistently does lookup( ) into lists $L_1$ and $L_2$, even though they provide no benefit: the lookup( )s into $L_3$ and $L_4$ are the only lookup( )s that skip any RIDs at all. An ANDtree that first intersects $L_3$ and $L_4$ and then intersects the result with $L_1$ and $L_2$ will do almost three times fewer lookup( )s. In general, when there are n legs, round robin intersection can do n times more lookups than the best AND-tree that a perfect optimizer would choose.

To avoid this slowdown, the embodiments herein propose an alternative probabilistic intersection. The idea is to maintain, for each leg $L_i$, a historical average of $L_i$.lookup(x)−x: the average number of RIDs skipped in lookup( )s to that leg in the past. This is referred to herein as the average jump for leg $L_i$.

Instead of doing lookup( )s always in round robin fashion, the embodiments herein choose the next leg to lookup into in one of two ways: 1) lookup into the most promising legs and 2) lookup into an arbitrary leg. Suppose that the most recent lookup( ) was into leg $L_j$. With respect to the lookup into the most promising leg, with probability p, the embodiments herein do the next lookup into the leg with the highest average jump in the recent past. If this leg is $L_j$ itself, there is no point in doing another lookup( ) because the embodiments herein will obviously find a match. Instead, the embodiments herein do a lookup into the leg with the second highest average jump. With respect to the lookup into an arbitrary leg, with probability 1−p, the embodiments herein do the next lookup in round robin fashion, into $L_{j+1\%(\#legs)}$, see FIG. 7. This method is similar to the explore-exploit tradeoff used in the machine learning literature. The first option exploits the information about the best legs (least density of RIDs) the embodiments herein have seen so far. The second option explores other legs to learn if their RID density has changed.

Figure 6A:
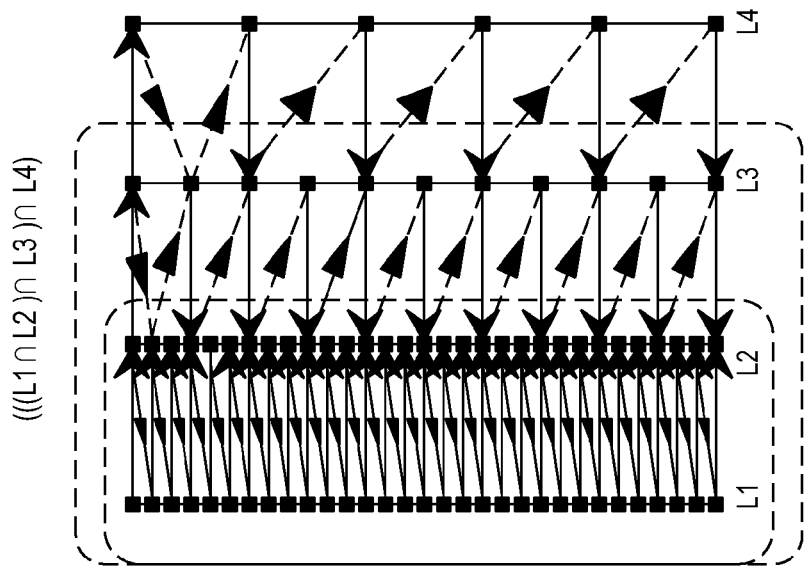

In an example like FIG. 6a, the average jump for $L_3$ and $L_4$ will quickly rise to be much more than that for $L_1$ and $L_2$, so this adaptive method will perform almost as well as the best AND-tree.

If a predicate is correlated with RID, the density in the corresponding leg will vary as the intersection progresses. Any single AND-tree will perform well in some regions and poorly in others. This probabilistic intersection on the other hand will adapt to the changing RID densities by switching to the less dense legs. As a result, probabilistic intersection can outperform even the best statically chosen AND-tree. In order to track changes in the average jump sizes (i.e., RID density) in a leg, the embodiments herein decay the average jump periodically.

This method has two parameters: the decay rate and the probability p. Setting the probability low will force the intersection to focus on the most selective legs without wasting time on other legs. However, an index leg might become less selective over time due to skew, and a low probability value may prevent the methodology from learning the selectivity change in time. Setting the probability high will allow for faster learning but has higher overhead in exploring unselective legs. In some situations, p=0.25 gives a good balance between performance and robustness. Also, good results appear when decaying the average jump by half every 100 lookup( )s; the embodiments herein have found this to work well for a variety of data distributions that the embodiments herein study in Section 4.

3. Lazy Merging

Having seen how to make the intersection phase perform more predictably, this disclosure now turns to the merge phase. The purpose of this phase is to realize the SortedRidList abstraction the embodiments herein used during intersection, in particular, the getNext( ) and lookup( ) primitives.

Eager Merging:

The standard way of realizing this interface is to merge the RID-lists on each leg before the intersection. The embodiments herein will call this method Eager Merging. For example, consider the predicate store.country=UK. Let the dimension keys satisfying this predicate be: $\pi$ storeId ($\sigma$ store.country=UK$^{Store}$)={$k_1, k_2, \ldots k_p$}. Eager Merging first looks up into the index on Orders.storeId with each dimension key $k_i$ to form a segment of matching: RIDs: $L_i$={Orders.rid|Orders.$k_i$}. Then the embodiments herein merge these segments together, to form a single sorted RID-list: $L=L_1 \cup L_2 \cup \ldots L_p$.

This disclosure next describes two optimizations that make this process more efficient. The embodiments herein start with an optimization that postpones the segment merging (assuming that every segment has been formed by reading in the leaf pages). The embodiments herein then present a further optimization that avoids reading in the segments upfront, and lazily reads in only those portions of each segment that are needed for the intersection.

These optimizations exploit two key properties of B-Tree indexes. First, the RIDs within each segment are sorted by RID. i.e., in an index, all entries for a given key are ordered by RID. This property holds true for B-Tree indexes, as long as there are no in-place updates. Newly inserted records get higher RIDs than previous records so they do not affect the sort order. Deleted records are marked as tombstones, and their RIDs are reused only upon a reorganization. The policy of doing no in-place update for fact tables is something followed in most warehouse implementations. Updates are rare, and are handled as insert/delete pairs. Second, in the lowest level non-leaf pages, each child (leaf page) pointer contains the highest RID in that leaf page. Essentially, this means that a single-index on a column c is treated as an index on (c,RID).

Note that both of these properties would implicitly hold if the segments were formed by lookups into a bitmap index. First, a segment stored as a bitmap represents its RIDs by turning on bits at appropriate positions in a bitmap. Hence RIDs in a bitmap are available in sorted order. Second, if a segment stored as a bitmap spans multiple pages, each page has a constant number of bits. So the highest RID in a page can be well estimated by using the position of that page in the bitmap. Thus, the optimizations herein would hold for bitmap indexes as well.

3.1 No Merging and Lazy Merging

A simple alternative to Eager Merging is No Merging that directly intersects unions of unmerged segments. The SortedRidList interface used in intersection can be implemented over unmerged segments $L_1 \ldots L_p$ of a leg L as follows:

start( ):
open a cursor on each $L_i|1 \leq i \leq p$
lookup(rid):
return $\min_{0 \leq i \leq p} L_i$.lookup(rid).
getNext( ):
let currSeg$\leftarrow$argmin$_{1 \leq i \leq p} L_i$.currentRid( ).
return $L_{currSeg}$.getNext( ).
currentRid( ):
return min$1 \leq i \leq p$ $L_i$.currentRid( ).

Observe that each operation on an unmerged leg L does p operations of the same kind, one on each of the unmerged segments of L. In effect, intersection with a union of unmerged segments is equivalent to pushing the intersection below the union via distributive property. For example, consider three legs that need to be intersected: A with 2 segments, B with p, and C with q. Eager Merging computes the intersection as $((A_1 \cup A_2) \cap (B_1 \cup B_2 \cup \ldots \cup B_p) \cap (C_1 \cup C_2 \cup C_3 \cup \ldots \cup C_q))$ whereas No Merging computes the intersection as $((A_1 \cap B_1 \cap C_1) \cup (A_1 \cap B_1 \cap C_2) \cup \ldots \cup (A_2 \cap B_p \cap C_q))$.

With No Merging, the gain from avoiding the merge is offset by the increased cost of lookup( )—the embodiments herein need to do separate lookup( )s in each unmerged segment. Superficially, it would seem that No Merging pays off for legs with a small number of large segments, such as leg A, but not for legs with large number of small segments, like leg B. However, the cost of No Merging a leg is also determined by the number of lookup( )s that happen on that leg during intersection. Each lookup( ) on B is p times more expensive than if the embodiments herein had merged the embodiments herein up front, but the intersection may not invoke that many lookup( )s on B at all. Moreover, even within the same leg the embodiments herein want to differentiate between very large and very small segments.

The embodiments herein quantify the tradeoff of merging a segment Li in leg L as follows:

$$\text{costeager}(L_i) = c_1 \times |L_i| \qquad (1)$$

$$\text{costnomerge}(L_i) = c_2 \times \text{numLookups}(L) \qquad (2)$$

where numLookups(L) is the number of times the intersection logic invoked lookup( )s on leg L. (1) follows from a linear cost formula for a merge of sorted lists; the embodiments herein have attributed to $L_i$ its contribution to the total merge cost (the embodiments herein ignore the slow growing log #segments factor to simplify the analysis). (2) is because if the embodiments herein do not merge $L_i$, every lookup( ) on leg L has to do an extra lookup ( ) on $L_i$.

Lazy Merging:

The embodiments herein do not know numLookups(L) beforehand. The embodiments herein depend loosely on the number of RIDs in the intersection of all the other legs (because the intersection logic has to check every one of them for existence in L). But, rather than trying to estimate numLookups(L) from selectivities, the embodiments herein use an online methodology similar to the well known one for the rent-vs-buy problem. The embodiments herein start with no segments merged, and merge segments lazily, merging $L_i$ after $\alpha$
$|L_i|$ lookups:

1. Initially, leave all segments in all legs un-merged.
2. For each leg L with segments $L_1 \ldots L_p$, add an extra segment $L_0$ to hold the segments to be merged in future: $L_0 \leftarrow \phi$.
3. During intersection, implement the SortedRidList interface on leg L thus:
   lookup(rid):
   numLookups(L)++
   if (numLookups(L)≥α|Li|) do $L_0 \leftarrow$ merge($L_0, L_i$).
   return $\min_{1 \leq i \leq p} L_i$.lookup(rid).
   getNext( ):
   currSeg←$\mathrm{argmin}_{1 \leq i \leq p}$ Li.currentRid( ).
   return $L_{currSeg}$.getNext( ).
   currentRid( ):
   return $\min_{1 \leq i \leq p} L_i$.currentRid( ).

Competitive Analysis: The cost of Lazy Merging depends on whether there are at least α|Li| lookups or not:
$\mathrm{cost}_{lazy}(L_i) = |L_i|c_{1+\alpha}|L_i|c_2$ if numLookups(L)≥α|Li|
=numLookups(L)$c_2$ else.

This disclosure now shows that this is within a factor of 2 of an oracle that follows the best possible merge policy. This oracle knows apriori the value of numLookups(L) for each leg L, and is allowed to choose Eager Merging or No Merging for each segment depending on which is faster, as calculated from formulas (1) and (2).

THEOREM 1. If the embodiments herein set $\alpha = c_1/c_2$, the total cost of Lazy Merging policy, including the cost of any merges and any extra lookup( )s into unmerged segments is ≤2× cost of the oracle merge policy.

PROOF. For any segment Li, from (3), $\mathrm{cost}_{lazy}(L_i) \_ |L_i|c_1 + \alpha|L_i|c_2$ and $\mathrm{cost}_{lazy}(L_i) \leq \mathrm{numLookups}(L)c_{2+num}\mathrm{Lookups}(L)c_1/\alpha$. Hence, from (1) and (2), $$\frac{\mathrm{cost}_{lazy}(L_i)}{\mathrm{cost}_{eager}(L_i)} \leq \frac{(c_1|L_i| + c_2\alpha|L_i|)}{(c_1|L_i|)} = 1 + \frac{c_2\alpha}{c_1}$$

$$\frac{\mathrm{cost}_{lazy}(L_i)}{\mathrm{cost}_{nomerge}(L_i)} \leq \frac{(c_1 \mathrm{numLookups}(L)/\alpha + c_2 \mathrm{numLookups}(L))}{(c_2 \mathrm{numLookups}(L))} = 1 + c_1/(\alpha c_2).$$

The oracle achieves min ($\mathrm{cost}_{eager}(L_i)$, $\mathrm{cost}_{nomerge}(L_i)$). So $$\frac{\mathrm{cost}_{lazy}(L_i)}{\mathrm{cost}_{oracle}(L_i)} \leq \max\left(1 + \frac{c1}{\alpha c_2}, 1 + \frac{\alpha c_2}{c_1}\right)$$

By setting $\alpha = c_1/c_2$, $\mathrm{cost}_{lazy}(Li) \leq 2\times \mathrm{cost}_{oracle}(L_i)$ With respect to choosing the potential constant, the value of $\alpha = c_1/c_2$ depends on the implementation costs of sorted list merge and lookup. This disclosure now presents a microbenchmark experiment to choose this constant.

Figure 8:
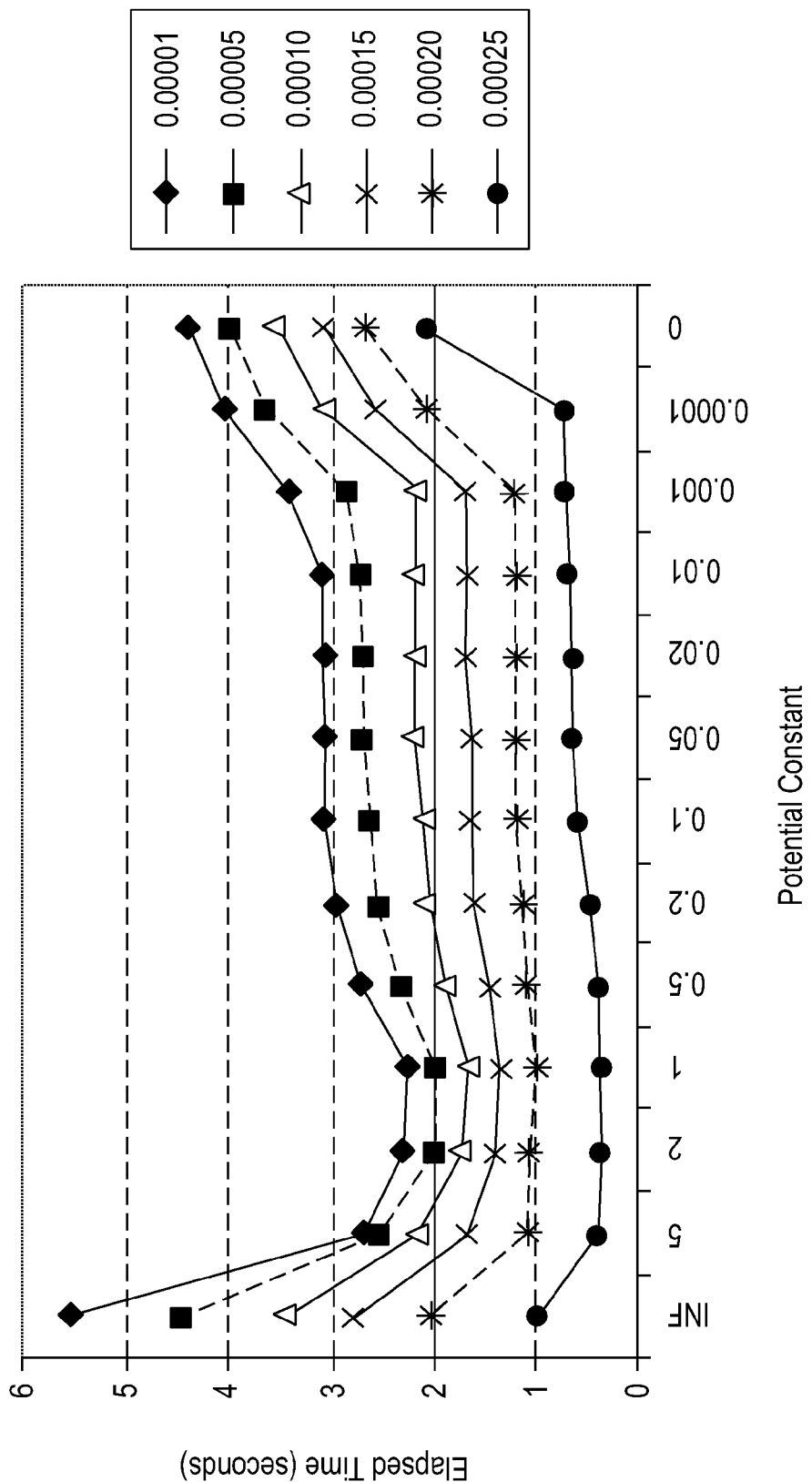
FIG. 8 illustrates performance of lazy merging.

The embodiments herein evaluate an intersection of 4 legs, DP, DC, DT, DS from our experiment schema (Section 4). The embodiments herein fix the selectivities of DP, DT, DS to be 0.02, 0.1 and 0.5, and vary selectivity of DC from 0.01 to 0.25. FIG. 8 plots the elapsed time of Lazy Merging for various values of α (the embodiments herein call this the potential constant).

The present merging policy is to merge a segment Li when numLookups(L)≥α|$L_i$|. So α=0 corresponds to Eager Merging. Likewise, α=∞ corresponds to No merging. Increasing values of α involve merging with increasing degree of laziness, implying greater lookup( ) cost and lower merge cost. Based on these results, the embodiments herein pick a value of α=1 as a sweet spot. The embodiments herein use this in the experiment section.

3.2 Lazy Segment Formation

Up till now, it has been assumed that the segments have been formed up front and have only deferred the merge. This disclosure now turns to lazy segment formation.

For a segment $L_i$ in leg L, let P be the set of rids used as parameters in calls to L.lookup( ). The only reason to form Li is to perform these lookups, and any values of $L_i$ that are not used in these lookups are irrelevant.

Consider an operation $L_i$.lookup(r). This operation performs a search, returning r if it is found, and the immediately next higher rid in Li otherwise. So there are only two values of $L_i$ that affect the behavior of this lookup: r (if present), and r'=min $\{x \in L_i | x > r\}$ (if r is found, the lookup is followed by a getNext( ) that fetches r').

Figures 9, 10:
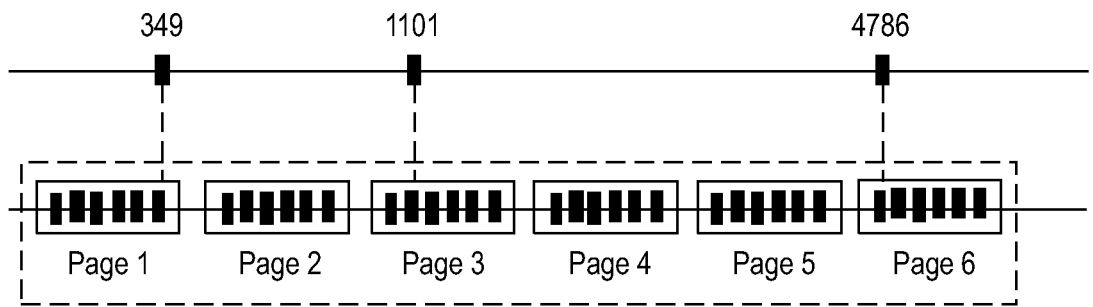
FIG. 9 illustrates avoiding page scan using high rids.
FIG. 10 is a table which illustrates lazy merging experiments.

The embodiments herein use this property to reduce the portion of $L_i$ that the embodiments herein form, and to defer the formation until the embodiments herein is needed during intersection. Since Li is a segment of a leg, the values in Li are the RIDs corresponding to a single index lookup: e.g., {Sales.rid|Sales.storeId=23}. So they correspond to the RIDs in a sequence of leaf pages of the index. For example, FIG. 9 shows six leaf pages for a segment of leg M that is being intersected with legs L1, L2, and L3 (P is L1∩L2∩L3). As in the last section, segments are drawn as number lines with RIDs as hash marks. Notice that the RIDS in P correspond to only the first, third, and sixth leaf page in the sequence for $L_i$. Hence the embodiments herein can avoid forming $L_i$ fully; the embodiments herein can skip the RIDs from the second, fourth, and fifth leaf page, and save the corresponding I/Os as well.

Recall that in a B-Tree in XYZ, each child pointer of a non-leaf page includes the highest RID among the descendants of that child. The embodiments herein use this highRid to decide, for a given rid in P, which leaf pages of $L_i$ could be relevant. In the example of FIG. 9, the highRid for the first page is 500 and that for the second is 1000. So the second page is irrelevant during a call for M.lookup (1101).

This highRid information is usable in all but the last leaf page for a segment. The last leaf page could be shared with other segments and so do not have a meaningful highRid. The embodiments herein only know that all rids in the last leaf page are >highRid of the penultimate leaf page.

For a leg L, the set P of RIDs that are parameters in calls to L.lookup(rid) is determined only during intersection. So, the embodiments herein form each segment Li of L in a lazy fashion as follows:

First, before intersection begins, the embodiments herein do an index lookup to form a list of page numbers of the leaf pages that contain $L_i$, and an array highRids(Li) of the highest RID on each leaf page. Notice that this process involves only the non-leaf pages of the index, which are almost always cached in main memory. The only exception is when the entire segment is contained in a single leaf page—the high-Rids tell us nothing about the range of RIDs in this case, and so the embodiments herein scan the leaf page and extract the RIDs.

Second, during the intersection, $L_i$ starts out unmerged with the other segments. Upon an invocation $L_i$.lookup(rid) (via L.lookup(rid)), the embodiments herein do a binary search in highRids($L_i$) to find the leaf pages that could possibly contain RID or the immediately next higher rid, and scan these leaf pages alone: i.e., if (highRids[i]<rid<highRids [i+1]) the embodiments herein scan the i+1'st leaf page, and if (highRids[i]=rid) the embodiments herein scan the i'th and i+1'st leaves. $L_i$.lookup(rid) can be evaluated using these pages alone. The embodiments herein cache the scanned pages so that the embodiments herein can reuse them if there is a subsequent invocation of lookup with a rid in the same range.

Third, during the intersection, when numLookups(L)≥α|$L_i$|, the embodiments herein need to merge $L_i$ with other segments. At this point the embodiments herein scan all the leaf pages in $L_i$.

The success of lazy segment formation on a leg L depends on the distribution of RIDs in P. If the RIDS in P are uniformly spread throughout the domain of RIDs, according to embodiments herein it is likely that they will straddle many pages of L. Still, the embodiments herein can save if the number of RIDs in P is smaller than the number of leaf pages in L, which happens for many selective queries (note that P is the intersection of all legs other than L).

Another condition that facilitates lazy segment formation is correlation of intersection predicates with rid. This often happens with predicates on the time (or date) dimension. Fact table RIDs are invariably strongly correlated with time because transactions are dominated by inserts and deletes. Many queries restrict their interest to values in a specific date range, via a predicate. Hence, if L is a leg on any predicate other than date, its P will be correlated with RID. So it is likely that all the RIDs in P will match against only a subset of the leaf pages for each segment $L_i \in L$, and the embodiments herein can avoid scanning and parsing the other leaf pages.

4. Experimental Evaluation

The embodiments herein have implemented the disclosed lazy merging and adaptive intersection methodology as an intersection library that is invoked from a prototype version of DB2 for z/OS. This disclosure now presents a detailed performance evaluation of this implementation. As in the previous sections, the embodiments herein divide the evaluation into two pieces: First, efficiency improvements by using lazy merging to form the sorted list of rids for each leg (Section 4.1), and second predictability improvements by using adaptive intersection vs. intersection via a statically chosen AND-tree for computing the intersection of the sorted lists (Section 4.2).

In each piece, the embodiments herein keep the other piece fixed: i.e., while evaluating lazy vs. eager merging the embodiments herein use a statically chosen AND-tree (the embodiments herein choose the best AND-tree by hand), and while evaluating adaptive intersection the embodiments herein merge rids eagerly up front (so that the intersection is on sorted lists). At the end, in Section 4.3 the embodiments herein have a combined evaluation of lazy merging with adaptive intersection for completeness. These experiments were run on an IBM RS/6000 pSeries 630 server with one Power 4 processor and 8 GB of RAM.

Figure 11:
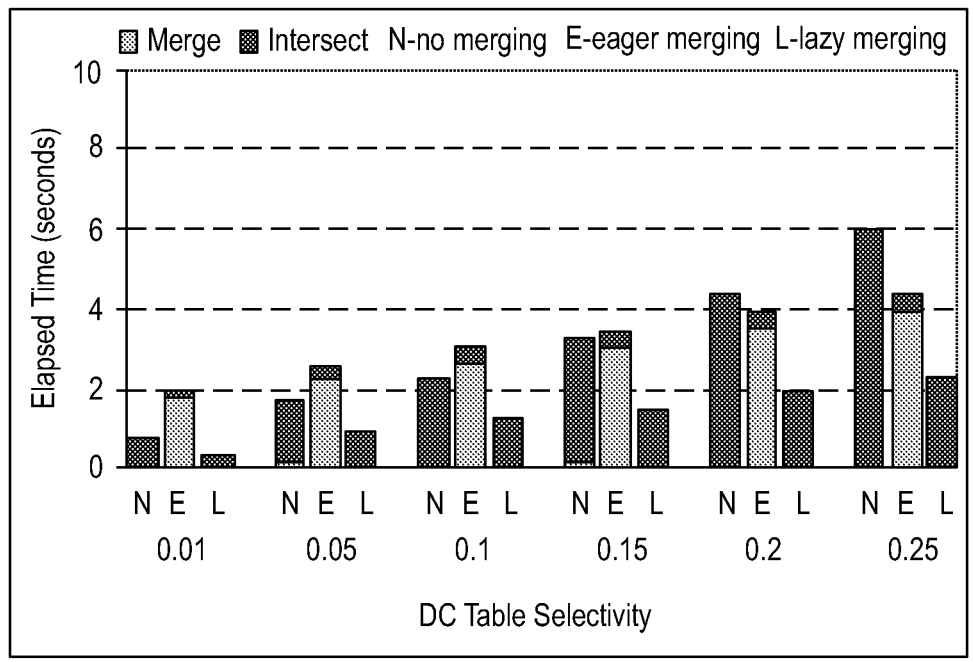
FIG. 11 is a bar graph illustrating lazy merging, eager merging, and no merging.

The embodiments herein start with a query over tables whose foreign key columns are uniformly distributed and uncorrelated with the RIDs in Orders, see FIG. 10:

SELECT DS.city, SUM(O.quantity), COUNT(DE.name)
FROM
   Orders O, Product DP, Customer DC,
   Employee DE, Store DS
WHERE
   O.customer id=DC.id AND
   O.product id=DP.id AND
   O.store id=DS.id AND
   DC.age=<value> AND DP.category=<value> AND
   DE.type=<value> AND DS.city=<value> group by DS.city The embodiments herein run several instances of this query, varying the predicate selectivity on Leg DC from 0.01 to 0.25 by changing the literal, keeping selectivities on DP, DE and DS fixed (0.02, 0.1, 0.5). FIG. 11 is a bar graph illustrating lazy merging, eager merging, and no merging for DC nDP∩DE nDS. Leg selectivities on DP 0.02, DE=0.1, DS=0.5, and that of DC varies from 0.01 to 0.25. FIG. 11 plots the elapsed time of No Merging, Eager Merging, and Lazy Merging as the embodiments vary the selectivity of Leg DC. Each bar shows the overall elapsed time, plus a break down into merge and intersect phases (indicated by shading). The merge phase is any segment formation and merging that happens before intersection begins.

The first observation is that No Merging and Lazy Merging beat Eager Merging handily at low selectivities, and the benefit drops as the embodiments increase the selectivity. To understand why, the embodiments shown in FIG. 18 the number of leaf page IOs that No Merging and Lazy Merging save over Eager Merging. As the selectivity increases, the number of leaf page IOs for Lazy Merging (and No Merging) increases much more sharply than for Eager Merging.

This behavior follows from the way Lazy merging uses highrids to avoid segment formation. With a uniform distribution, the RIDs of Orders table are scattered uniformly across all the segments. But at low selectivities, the combined number of RIDs that is used to lookup( ) into each leg is still small, and will find no match in many leaf pages. Lazy merging avoids IO on these pages using the high-rids information in the non-leaf pages.

Due to this IO saving and the associated reduction in parsing cost, Lazy Merging and Eager Merging win at low selectivities. No Merging starts to lose to Eager Merging at selectivities beyond 0.20, due to the increased number of lookups in unmerged segments.

However, Lazy Merging remains competitive with Eager Merging even at higher selectivities. Since all the dimension legs are uniform distributed, all segments within a leg are roughly the same size, and Lazy Merging does not help to preferentially merge some smaller segments. But still, segment sizes vary across legs, and Lazy Merging results in the legs with a small average segment size being merged early (almost like EagerMerging), while the legs with a large average segment size are merged very late (almost like No Merging).

Notice that the cost of Eager Merging is mainly in the merge phase—because it merges segments up front, while that of Lazy Merging and No Merging arise primarily from the intersect phase. This highlights a secondary advantage of Lazy Merging, that it outputs results in a pipelined fashion, in contrast to Eager Merging. Both Lazy Merging and No Merging algorithms incur a small up front merge cost. This is for the few segments that are contained entirely in one page. Since the high-rids information is not helpful for these segments, they have to be scanned anyway. The embodiments scan and merge such segments in the beginning, before intersection begins.

4.1.2 Uniform Distribution with Bad Residual

The embodiments now consider a slight variation of the previous experiment that highlights the utility of LazyMerging when the optimizer makes a bad decision. The embodiments run a query where the optimizer adds to the index anding phase a dimension that is both poorly selective, and has very few segments. Ideally, such a dimension should be joined as a residual after the index anding phase.

Figure 12:
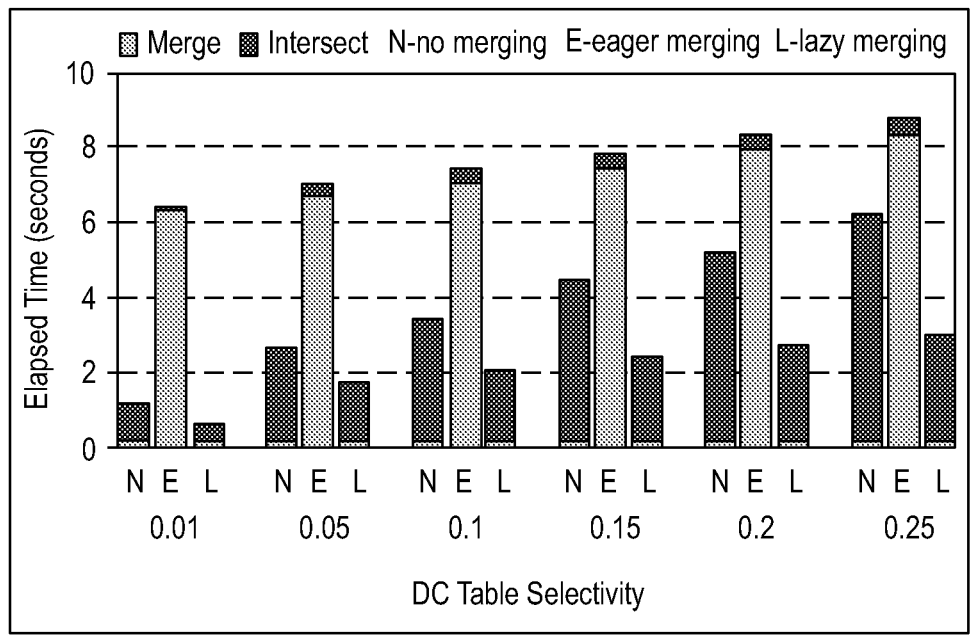
FIG. 12 is a bar graph illustrating lazy, eager, and no merging.

The embodiments repeat the previous experiment by adding an additional table DW with the following predicate DW.city=<value> to the query, and forcing a query plan where leg DW is intersected during index anding. FIG. 12 is a bar graph illustrating lazy, eager, and no merging for DC∩DP∩DE∩DS∩DW. Leg selectivities: DP=0.02, DE=0.1, DS=0.5, DW=0.5, that of DC varies from 0.01 to 0.25. FIG. 12 plots the elapsed time of Eager, Lazy, and No Merging. Observe that the elapsed time for Eager Merging has been doubled or even tripled with the addition of DW. On the other hand, the elapsed time for NoMerging and LazyMerging have only increased modestly. In particular, notice that No Merging beats Eager Merging even at high selectivities (0.25 on DC), in contrast to the previous experiment (FIG. 11). The poor performance of Eager Merging arises from the large cost of merging the segments of DW: DW has 5M rids even after its local predicate has been applied.

On the other hand, No Merging and Lazy Merging perform well because the intersection of DP, DC, DE and DS has already produced a very small list of matching RIDs, and these can be used to skip over most of the pages of DW. Thus, LazyMerging acts as a safeguard against bad residuals and improves the query predictability.

4.1.3 Uniform Distribution with Rid Correlation

Figure 13:
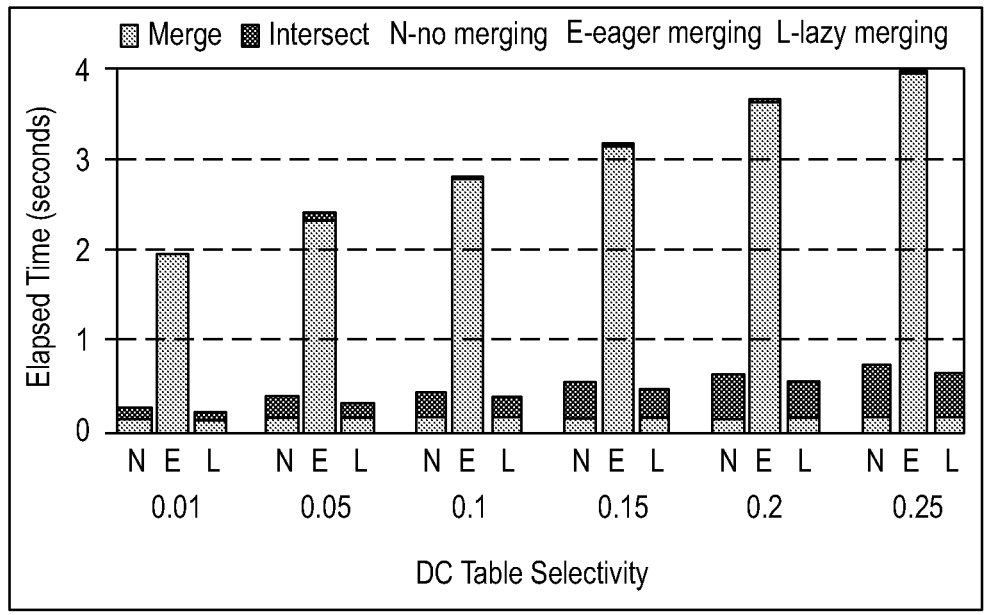
FIG. 13 is a bar graph illustrating lazy, eager, and no merging.

The embodiments evaluate how addition of a predicate correlated with rid affects the merging algorithms. Dimension table DT in the schema is a time dimension, and its values are naturally correlated with RID (newly inserted records tend to have higher dates). The embodiments add DT to the query (the embodiments remove DW, so the query is otherwise like in Section 4.1.3), with a predicate with selectivity 0.1, and repeat the same measurements as the previous two experiments. FIG. 13 is a bar graph illustrating lazy, eager, and no merging for DC∩DP∩DE∩DS∩DT. DT is correlated with RID. Leg selectivities: DP=0.02, DE=0.1, DS=0.5, DT=0.1, DC=0.01 to 0.25. FIG. 13 compares the elapsed time of Eager Merging, No Merging, and Lazy Merging with the addition of leg DT. Notice that No Merging and Lazy Merging gain huge benefits from rid correlation, while the elapsed time of Eager Merging improves by little. The main disadvantage for No Merging is the increased cost of separate lookup( )s in each unmerged segment. However, when rid correlation happens, the unmerged segments have very little overlapping rid-range with one another. With the aid of High-RID, the cost of separate lookup( )s are kept cheap in most unmerged segments. On the other hand, EagerMerging has to pay the expensive cost of merging the segments.

4.1.4 Skewed Distribution with No Rid Correlation

To evaluate the impact of skew, the embodiments add one more dimension leg DA (Account) into the query, with the Zipf distribution on Orders.account_id. The other four original legs (DP, DC, DE, and DS) still maintain uniform distributions. The embodiments re-run the same experiments by varying the selectivity on DC.

Figure 14:
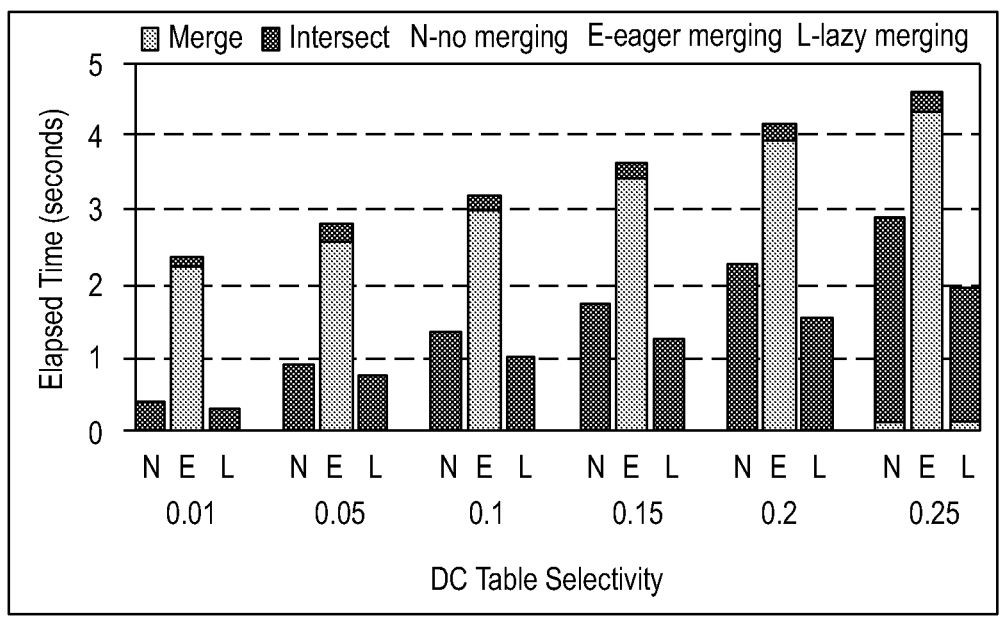
FIG. 14 is a bar graph illustrating effectiveness of lazy merging on skewed data.

FIG. 14 shows that similar to rid correlation, skew also gives advantages to Lazy Merging. FIG. 14 illustrates effectiveness of lazy merging on skewed data for DC∩DP∩DE∩DS∩DA. DA has skewed data. Leg selectivities on DP=0.02, DE=0.1, DS=0.5, DA=0.1, and that of DC varies from 0.01 to 0.25. Due to skew, the segments of leg DA have varying sizes, and large-sized segments present an opportunity for Lazy Merging to avoid scanning pages. However, skew is not so helpful for No Merging. This is because skew also creates many small segments. For No Merging, these small segments introduce extra lookup( )s, which offset the benefits from scan avoidance in the large segments. Whereas, Lazy Merging merges these small segments early and thus performs better.

4.2 Predictability from Adaptive Intersection

Section 4.1 examined the value of lazy merging, and the embodiments now turn to the effects of adaptive intersection. The traditional best-ANDtree approach relies on the optimizer having the right statistics to pick the best AND-tree. However, the optimizer may often choose a poor AND-tree due to wrong statistics. In this section, the embodiments evaluate the robustness of intersection algorithms when the optimizer chooses a poor AND-tree. To focus on the intersection performance alone, the embodiments use Eager Merging in all the experiments in this section.

The embodiments report are the intersection times: the merge phase is the same for all intersection algorithms.

The embodiments use 4 dimension tables from the previous section: DP, DC, DE, DS, and add 6 extra dimensions. The first four have uni-form distribution (in the corresponding foreign key column in Orders).

The six new dimensions have correlation with RID. Three of these have forward RID correlation (meaning that the predicates on these legs selects foreign keys that occur more frequently in higher RIDs), and three have backward RID correlation (the converse). FIG. 19 shows the cardinality and skew of each leg.

Since the goal is to study the predictability of query performance, the embodiments generate 100 queries by randomly choosing the number of dimensions to join, which dimensions to join, and their selectivities. For each query, the embodiments produce the best AND-tree and the worst AND-tree query plan based on the selectivities. Then the embodiments run the 100 queries under four intersection scenarios, 1) best AND-tree intersection, 2) worst AND-tree intersection, 3) round-robin intersection using the worst AND-tree, and 4) probabilistic round-robin using the worst AND-tree. The embodiments use the first scenario as the base, and compare results from the last three to the best AND-tree intersection. The goal is to find how bad it can be for the optimizer to pick the wrong AND-tree, and how well roundrobin and probabilistic round-robin intersection do in this case.

Figure 15A:
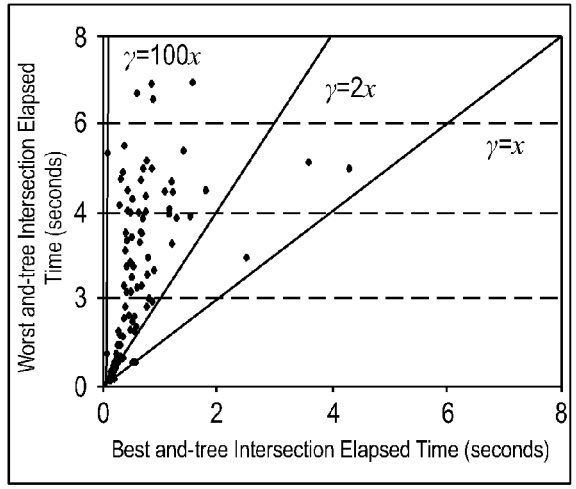
FIGS. 15($a$)-15($c$) are graphs illustrating comparison of 4 intersection algorithms on 100 randomly generated queries.
Figure 15B:
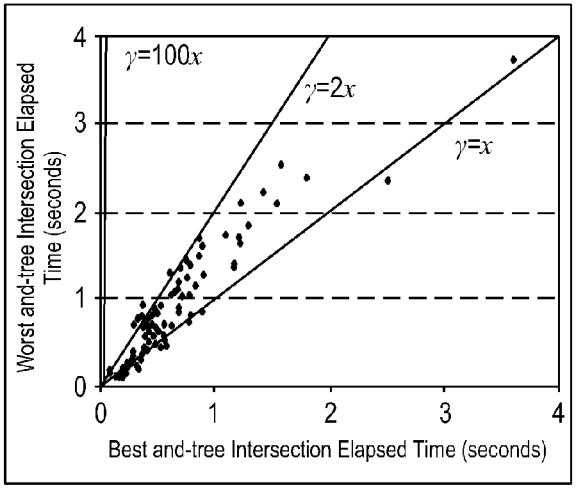
Figure 15C:
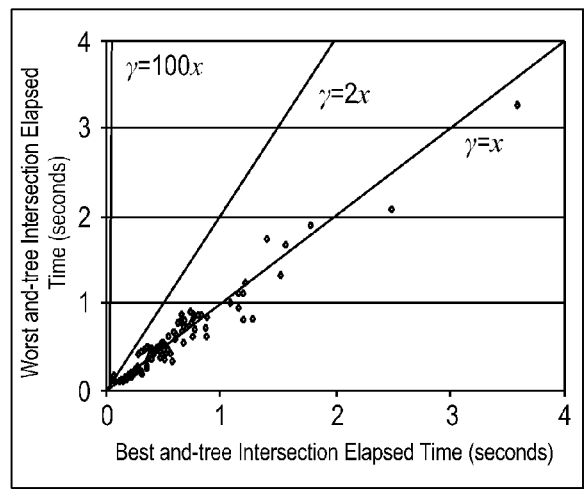

FIG. 15 (a) compares the performance of the best AND-tree and the worst AND-tree for each query. Each dot represents a query, and its X-coordinate is the elapsed time for the best AND-tree plan while the Y-coordinate is the elapsed time for the worst AND-tree plan. The embodiments also plot three slopes y=100x, y=2x, y=x for reference. Notice that for some queries, the elapsed time for the worst AND-tree plan is 100 times the elapsed time for the best AND-tree plan. That means these queries are very sensitive to the order of the AND-tree; if the optimizer chooses the wrong order, the queries will be up to 100 times slower. FIG. 15 (b) is the same plot, with worst AND-tree replaced by round-robin intersection. The points are now clustered almost exclusively between the y=2x and y=x lines, showing that the performance is always within a factor of two of the best possible.

FIG. 15 (c) demonstrates the results for the new probabilistic intersection, which does round-robin part of the time, and lookup( )s in the best leg otherwise. Most queries are contained near or below y=x line, i.e., the performance is as good as the best elapsed time using an AND-tree. This highlights the predictability of this intersection algorithm. For more than a half of the 100 queries, the learning algorithm beats the elapsed time of the best static AND-tree. This is because the selectivity on the dimensions is different in different rid ranges. As the embodiments do lookup( )s in intersection, the learning algorithm dynamically finds the most two selective legs and makes the largest jump, while the static AND-tree has to stick to a fixed order of legs and the round-robin has to go around all the legs each time.

4.3 Combined Performance Result

Figure 16:
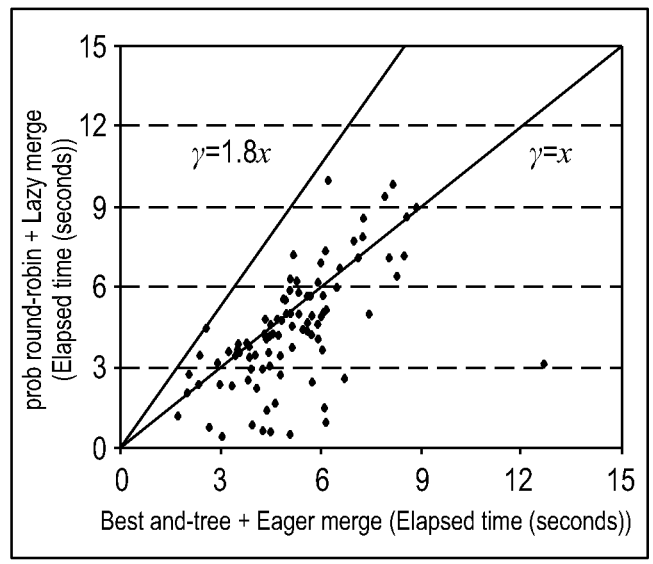
FIG. 16 is a graph illustrating performance of lazy merging with adaptive intersection on queries over random subset of dimensions.

Finally, the embodiments present the overall performance of the proposed index anding method: Lazy Merging plus adaptive intersection with probabilistic round-robin. The embodiments repeat the experiment of 100 randomly generated queries derived from the 10 index legs. FIG. 16 shows the overall elapsed time, including both merging and intersection phases. The X-coordinate is the elapsed time using intersection with the best static AND-tree, and Eager Merging. The Y-coordinate is the elapsed time using the new adaptive intersection and Lazy Merging algorithm.

Notice that the majority of the points are well below the y=x line. For these queries, lazy adaptive intersection beats the traditional eager AND-tree intersection, reducing the overall elapsed time by a factor of 5 in many cases. There are some points above the y=x line, indicating performance regression. But all the 100 queries fall under the y=1.8x line, which means, the proposed lazy merging and adaptive intersection algorithm always performs within 1.8 times of what is achieved by the best AND-tree, even though the embodiment assumes no knowledge of cardinalities.

The embodiments have done some further analysis of this regression. The findings are that the queries with regression are queries over very few dimensions. When a query does not have many dimension legs, the algorithms have few opportunities to enjoy the benefits from Lazy Merging or adaptive intersection.

Figure 17:
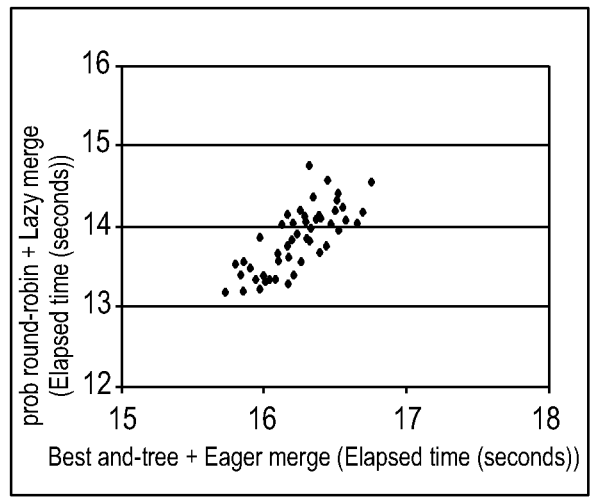
FIG. 17 is a graph illustrating performance of lazy merging with adaptive intersection on a query over all 10 dimensions, with randomly chosen selectivities.

So the embodiment repeats the overall elapsed time experiments on 50 new queries that involve all 10 legs. The embodiments generate these 50 queries by randomly choosing the selectivities on each leg. The results are shown as FIG. 17. Using the traditional Eager Merging and static AND-tree approach, the 50 queries all take 15 to 17 seconds. However, with the adaptive intersection and Lazy Merging algorithm, the overall elapsed time shrinks to the range between 13 and 15 seconds. That shows the approach is more likely to beat the traditional method when the queries involves more legs.

5. Related Work

Index anding has been used in query processors for a long time. An early disclosure [7] proposed the use of an AND-tree for accessing a single table using multiple indexes. While the basic methodology accesses indexes in a sequential manner, this disclosure also exploits parallelism by using one process for each index access. This parallel approach supports dynamic adaptation by choosing the intersection legs at the run-time and turning off an unselective leg. The sequential approach relies on the optimizers good estimate of statistics.

The parallel alternative avoids the dependency on base table statistics, but implicitly makes an independence assumption about the size of the intermediate intersections. The embodiments herein do not address changing leg selectivities either. A popular way to do index anding is with bitmapped and bits-sliced indexes (e.g., [9]). These are widely used in data warehouses and alleviate some of the problems of index anding due to their high efficiency. But they are not suitable for evaluating some predicates, and have a high maintenance cost when the update volume is high. The lazy merging methodology disclosed herein can improve the performance of index anding using B-Tree indexes, and the adaptive intersection methodology can work well with both bitmap and B-Tree indexes.

In XML databases, RID-list intersection is used in finding all the matching occurrences for a twig pattern that selection predicates are on multiple elements related by an XML tree structure. [4] proposed a holistic twig join methodology, TwigStack, for matching an XML twig pattern. IBM's DB2 XML (available from IBM Corporation, Armonk, N.Y., USA) has implemented a similar methodology for its XANDOR operator [2]. TwigStack is similar to round-robin intersection, navigating around the legs for results matching a pattern. The probabilistic round-robin methodology can be applied to this context also. Lazy Merging is not as relevant in the XML context since the number of OR segments is usually small, and No Merging works fine.

A completely different way of doing star joins is to use multi-column indexes. If a single index meets most of the predicates, the remaining predicates can be treated as residuals and there is no need for intersection at all. This method is very efficient with the right indexes, but needs a DBA to pick the "right" multi-column indexes and clustering for the workload, and often causes a high administrative burden. A large number of multi-column indexes also increases the update maintenance overhead. In contrast, index anding relies on single-column indexes. The number of possible single-column indexes is small enough that are built as a default on foreign key columns.

The merge phase of sort-merge joins is usually done by a linear search in the join inputs. M. Kamath et al. [6] present a bucket skip merge join that divides the sorted inputs into buckets and calculates the value range for each bucket. The merge phase then uses the value range to skip whole or partial buckets, similar to the way the embodiments herein use the high-rid information in the B-Tree. This approach is similar to No-Merging methodology; however this does not address the tradeoff between sort merge cost and RID lookup cost in unmerged segments. In comparison, the Lazy-Merging methodology considers this tradeoff by dynamically determining if the embodiments herein should merge segments.

Another area where adaptive ordering crops up is in selection join ordering. [8] present an adaptive methodology for ordering pipelined selections even when there are correlations. One difference between this problem and the index anding problem is that in selection ordering the input table is coming in as a stream and flowing through the selection operators, so each selection operator is like a leg that only supports contains( ) (as opposed to lookup( ). Still, adaptive selection ordering is also useful in index anding, for deciding on the order among the residual tables. There are also some proposed mechanisms for dynamically adapting join orders (like [1]), but no well analyzed adaptation policies yet.

6. Conclusion

RID-list intersection is a widely used operation in query processing, from star joins to column stores. The embodiments herein have presented two new methodologies for two phases of this operation: a lazy merging methodology for forming sorted RID-lists of rows matching each predicate, and an adaptive intersection methodology for intersecting these RID-lists. Deferred merging is considerably more IO efficient than the usual approach of eager merging. But the embodiments herein can be CPU-inefficient due to increased number of lookups into unmerged segments, so the embodiments herein provide a lazy merging methodology that monitors the cost of these extra lookups and merges segments when this cost gets too high. The adaptive intersection does not rely on selectivity estimates to choose an AND-tree. Rather, the embodiments herein dynamically learn which dimensions are more selective as the intersection proceeds and preferentially uses these dimensions to sweep the space of RIDs.

Experimentally, the methods herein perform much better than traditional eager merging and AND-trees, with the improvement being higher for skewed or correlated data. The methods presented herein are also more predictable, in that they never perform much worse than what the best AND-tree would.

Figure 20:
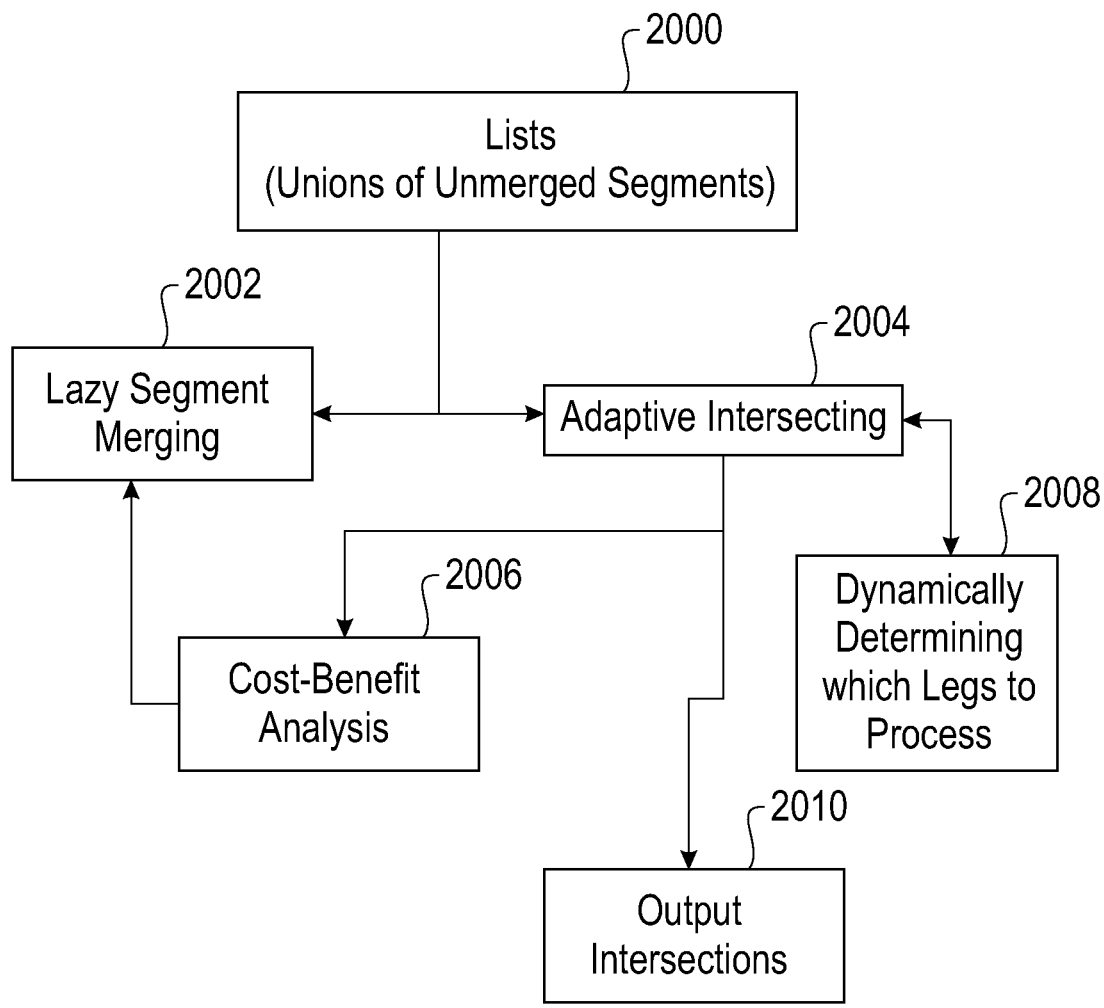
FIG. 20 is a flowchart illustrating a query processing method.

One example of the processing performed herein is shown in flowchart form in FIG. 20. More specifically, FIG. 20 illustrates a query processing method to intersect two or more unsorted lists based on a conjunction of predicates. As mentioned above, each list comprises a union of multiple sorted segments and the method performs lazy segment merging and an adaptive n-ary intersecting process.

More specifically, in item 2000, the lazy segment merging starts with each list being a union of completely unmerged segments, such that lookups into a given list involve separate lookups into each segment of the given list.

The method intersects the lists according to the predicates in item 2004 simultaneously while performing the lazy segment merging 2002, such that the lazy segment merging reads in only those portions of each segment that are needed for the intersecting. The intersecting further comprises determining if each leg has an RID as shown in item 2008 (a leg comprises an RID list corresponding to a predicate). The intersecting separately intersects each segment of a leg that has an RID. In addition, the lists comprise leaf pages and the lazy segment merging only merges one of the leaf pages that possibly contain RIDs.

As the intersecting proceeds and the lookups are performed, the intersecting selectively merges the segments together, based on a cost-benefit analysis of the cost of merging compared to the benefit produced by reducing a number of lookups (as shown in item 2006). The cost and benefit comprise measures of processing time. As shown in item 2008, the intersecting comprises an adaptive n-ary intersection process that dynamically varies which leg to process, based on a relative density of row identifications (RIDs) within the legs. In item 2010, the intersections are output.

The embodiments of the invention can take the form of an entirely hardware embodiment, an entirely software embodiment or an embodiment including both hardware and software elements.

In a preferred embodiment, the invention is implemented in software, which includes but is not limited to firmware, resident software, microcode, etc. Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 21:
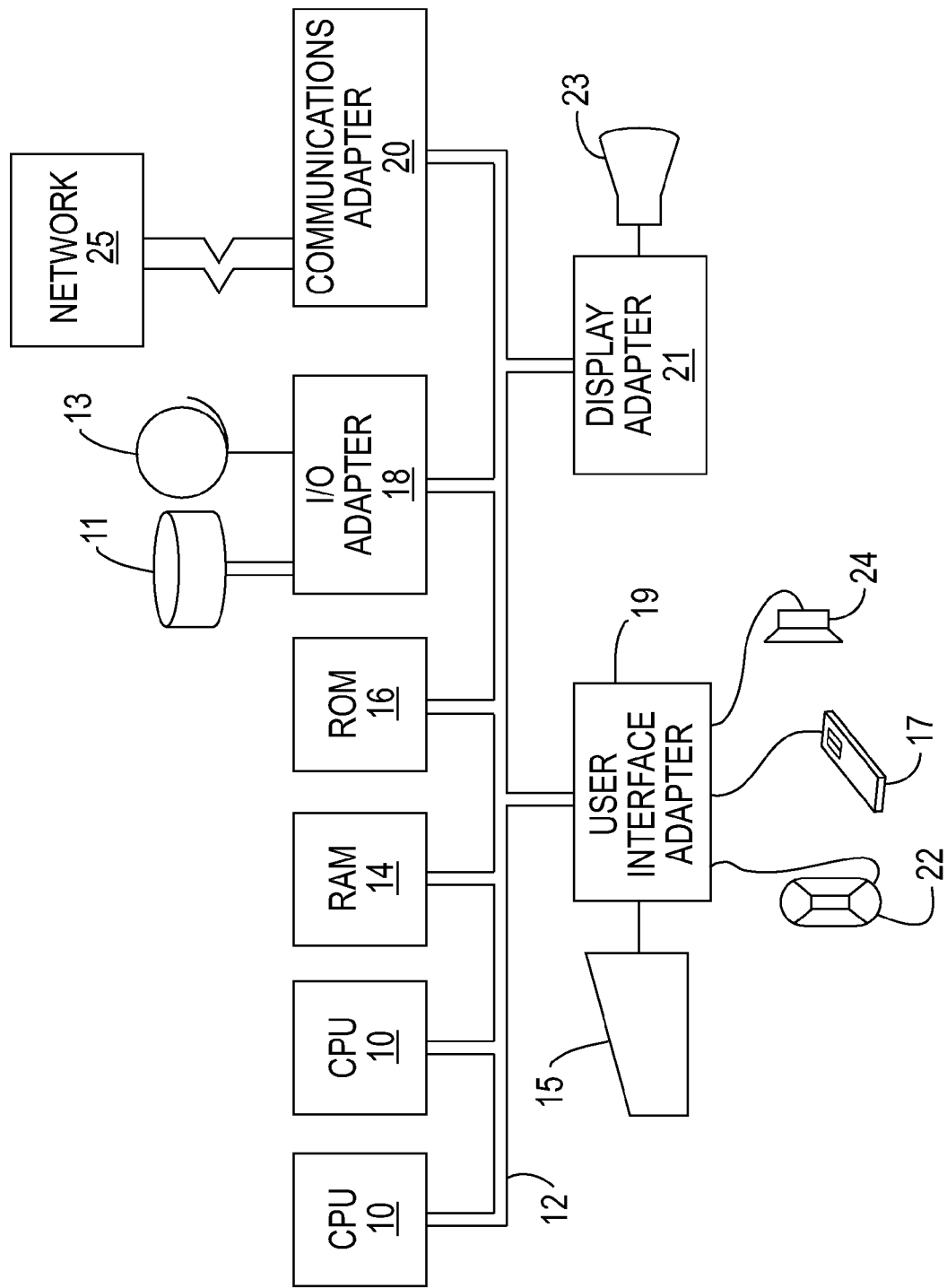
FIG. 21 is a schematic drawing illustrating a hardware configuration.

A representative hardware environment for practicing the embodiments of the invention is depicted in FIG. 21. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. The embodiments herein are to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

REFERENCES

[1] R. Avnur and J. Hellerstein. Eddies, "Continuously Adaptive Query Processing," In SIGMOD, 2000, pp. 267-272.
[2] A. Balmin, T. Eliaz, J. Hornibrook, L. Lim, G. M. Lohman, D. Simmen, M. Wang, and C. Zhang, "Cost-Based Optimization in DB2 XML," IBM Systems Journal, 45(2), 2006, pp. 1-23.
[3] J. Barbay and C. Kenyon, "Adaptive Intersection and T-Threshold Problems," In SODA, 2002, pp. 390-399.
[4] N. Bruno, N. Koudas, and D. Srivastava, "HolisticTwig Joins: Optimal Xml Pattern Matching," In SIGMOD, 2002, pp. 1-12.
[5] E. Demaine, A. L'opez-Ortiz, and J. Munro, "Adaptive Set Intersections, Unions, and Differences," In SODA, 2000, pp. 29-43.
[6] M. Kamath and K. Ramamritham, "Bucket Skip Merge Join: A Scalable Algorithm For Join Processing In Very Large Databases Using Indexes," Technical Report UM-CS-1996-020, University of Massachusetts at Amherst, 1996, Abstract Page 1.
[7] C. Mohan, Don Haderle, Yun Wang, and Josephine Cheng, "Single Table Access Using Multiple Indexes: Optimization, Execution, and Concurrency Control Techniques," In Proceedings of the International Conference on Extending Database Technology, 1990, Abstract Page 1.
[8] Shivnath Babu, Rajeev Motwani, Kamesh Mungala, Itaru Nishizawa, and Jennifer Widom, "Adaptive Ordering Of Pipelined Stream Filters," In SIGMOD, 2004, pp. 1-10.
[9] P. O'Neil and D. Quass, "Improved Query Performance With Variant Indexes," In SIGMOD, 1997, pp. 38-49.

What is claimed is:

1. A computer-implemented query processing method comprising:
receiving a query into a computing device, said query containing predicates identifying constraints on said query;
identifying, by said computing device, lists of values comprising data satisfying a predicate of said query, each list of values comprising one or more segments, each segment comprising an ordered group of elements;
forming, by said computing device, a list of page numbers of leaf pages associated with said lists of values;
forming, by said computing device, an array of highest row identifications (RIDs) for each leaf page;
performing, by said computing device, lazy segment merging of two or more lists of values, said lazy segment merging starting with each list of values being a union of completely unmerged segments, such that lookups into a given list of values involve separate lookups into each segment of said given list of values, said lazy segment merging comprising merging only ones of said segments having index leaf pages that possibly contain RIDs corresponding to a predicate, based on said array of highest RIDs;
intersecting, by said computing device, portions of said lists of values, according to a conjunction of said predicates, while performing said lazy segment merging, such that said lazy segment merging reads in only those portions of each segment that contain RIDs for said intersecting, said intersecting comprising an adaptive n-ary intersection process that dynamically varies which leg to process based on relative density of RIDs within said lists of values, said intersecting comprising separately intersecting each segment of a list having a row identification (RID) corresponding to a predicate; and
outputting, by said computing device, intersections of said portions of said lists when each of said portions contains a matching RID.

2. The computer-implemented query processing method of claim 1, said intersecting further comprising selectively merging segments together, by said computing device, based on a cost-benefit analysis of a cost of merging compared to a benefit produced by reducing a number of lookups.

3. The computer-implemented query processing method of claim 1, each said list of values comprising a union of multiple segments.

4. The computer-implemented query processing method according to claim 1, said leg comprising a RID list corresponding to said predicate.

5. The computer-implemented query processing method according to claim 4, said intersecting further comprising determining if each said leg has an RID value.

6. The computer-implemented query processing method according to claim 5, said intersecting further comprising separately intersecting each segment of said leg that has an RID value.

7. The computer-implemented query processing method according to claim 1, said lists of values comprising index leaf pages, and each said segment comprising a set of RIDs that is contained in an index leaf page.

8. The computer-implemented query processing method according to claim 7, said lazy segment merging comprising merging only segments of said leg associated with index leaf pages that possibly contain RIDs.

9. The computer-implemented query processing method according to claim 2, said cost of merging and said benefit produced further comprising measures of processing time.

10. A computer-implemented query processing method comprising:
receiving a query into a computing device, said query containing predicates identifying constraints on said query;
identifying, by said computing device, lists comprising data satisfying a predicate of said query, each list comprising one or more segments, each segment comprising an ordered group of elements;
forming, by said computing device, a list of page numbers of leaf pages associated with said lists;
forming, by said computing device, an array of highest row identifications (RIDs) for each leaf page;
performing, by said computing device, lazy segment merging of two or more unsorted lists, said lazy segment merging starting with each list being a union of completely unmerged segments, such that lookups into a given list involve separate lookups into each segment of said given list, said lazy segment merging comprising merging only ones of said segments having index leaf pages that possibly contain RIDs corresponding to a predicate, based on said array of highest RIDs;
intersecting, by said computing device, portions of said lists according to a conjunction of said predicates while performing said lazy segment merging, such that said lazy segment merging reads in only those portions of each segment that contain RIDs for said intersecting, said intersecting comprising an adaptive n-ary intersection process that dynamically varies which leg to process based on a relative density of RIDs within said lists, said intersecting comprising separately intersecting each segment of a list having a row identification (RID) corresponding to a predicate; and outputting, by said computing device, intersections of said portions of said lists when each of said portions contains a matching RID, as said intersecting proceeds and said lookups are performed, said intersecting comprising selectively merging segments together, by said computing device, based on a cost-benefit analysis of a cost of merging compared to a benefit produced by reducing a number of lookups.

11. The computer-implemented query processing method according to claim 10, said leg comprising a RID list corresponding to said predicate.

12. The computer-implemented query processing method according to claim 11, said intersecting further comprising determining if each said leg has an RID.

13. The computer-implemented query processing method according to claim 12, said intersecting further comprising separately intersecting each segment of a leg that has an RID.

14. The computer-implemented query processing method according to claim 11, said lists comprising index leaf pages, and each said segment comprising a set of RIDs that is contained in an index leaf page.

15. The computer-implemented query processing method according to claim 14, said lazy segment merging comprising merging only segments of said leg associated with index leaf pages that possibly contain RIDs.

16. The computer-implemented query processing method according to claim 10, said cost and said benefit comprising measures of processing time.

17. A computer-implemented query processing method comprising:

receiving a query into a computing device, said query containing predicates identifying constraints on said query;

identifying, by said computing device, lists comprising data satisfying a predicate of said query;

forming, by said computing device, a list of page numbers of leaf pages associated with said lists;

forming, by said computing device, an array of highest row identifications (RIDs) for each leaf page;

performing, by said computing device, lazy segment merging of two or more unsorted lists, each list comprising one or more segments, each segment comprising an ordered group of elements, said lazy segment merging starting with each list being a union of completely unmerged segments, such that lookups into a given list involve separate lookups into each segment of said given list, said lazy segment merging comprising merging only ones of said segments having index leaf pages that possibly contain RIDs corresponding to a predicate, based on said array of highest RIDs;

intersecting, by said computing device, portions of said lists according to a conjunction of said predicates while performing said lazy segment merging, such that said lazy segment merging reads in only those portions of each segment that contain RIDs for said intersecting; and outputting, by said computing device, intersections of portions of said lists when each of said portions contains a matching row identification (RID), as said intersecting proceeds and said lookups are performed, said intersecting comprising selectively merging segments together, by said computing device, based on a cost-benefit analysis of a cost of merging compared to a benefit produced by reducing a number of lookups, and said intersecting comprising an adaptive n-ary intersection process that dynamically varies which leg to process, based on a relative density of RIDs within various legs, a leg comprising a RID list corresponding to said predicate.

18. The computer-implemented query processing method according to claim 17, said intersecting further comprising determining, by said computing device, if each said leg has an RID.

19. The computer-implemented query processing method according to claim 18, said intersecting further comprising separately intersecting, by said computing device, each segment of a leg that has an RID.

20. The computer-implemented query processing method according to claim 17, said lists comprising index leaf pages, and each said segment comprising a set of RIDs that is contained in an index leaf page.

21. The computer-implemented query processing method according to claim 20, said lazy segment merging comprising merging only segments of said leg associated with index leaf pages that possibly contain RIDs.

22. The computer-implemented query processing method according to claim 17, said cost of merging and said benefit produced comprising measures of processing time.

23. A non-transitory program storage device comprising a computer storage medium that tangibly embodies a program of instructions executable by a computer to perform a method comprising:

receiving a query containing predicates identifying constraints on said query;

identifying lists comprising data satisfying a predicate of said query;

forming a list of page numbers of leaf pages associated with said lists;

forming an array of highest row identifications (RIDs) for each leaf page;

performing lazy segment merging of two or more unsorted lists, each list comprising one or more segments, each segment comprising an ordered group of elements, said lazy segment merging starting with each list being a union of completely unmerged segments, such that lookups into a given list involve separate lookups into each segment of said given list, said lazy segment merging comprising merging only ones of said segments having index leaf pages that possibly contain RIDs corresponding to a predicate, based on said array of highest RIDs;

intersecting portions of said lists according to a conjunction of said predicates while performing said lazy segment merging, such that said lazy segment merging reads in only those portions of each segment that contain RIDs for said intersecting, said intersecting comprising separately intersecting each segment of a list having a row identification (RID) corresponding to a predicate; and outputting intersections of said portions of said lists when each of said portions contains a matching RID, as said intersecting proceeds and said lookups are performed, said intersecting comprising selectively merging segments together, based on a cost-benefit analysis of a cost of merging compared to a benefit produced by reducing a number of lookups, and said intersecting comprising an adaptive n-ary intersection process that dynamically varies which leg to process, based on a relative density of RIDs within said lists.

* * * * *